(12) United States Patent
Tsuyuzaki

(10) Patent No.: US 11,095,782 B2
(45) Date of Patent: Aug. 17, 2021

(54) INFORMATION PROCESSING APPARATUS, IMAGE FORMING APPARATUS, AND NON-TRANSITORY COMPUTER READABLE MEDIUM FOR PROVIDING NOTICE OF INCONSISTENT SETTINGS

(71) Applicant: FUJIFILM BUSINESS INNOVATION CORP., Tokyo (JP)

(72) Inventor: Norihiko Tsuyuzaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 104 days.

(21) Appl. No.: 16/200,983

(22) Filed: Nov. 27, 2018

(65) Prior Publication Data

US 2019/0182393 A1 Jun. 13, 2019

(30) Foreign Application Priority Data

Dec. 11, 2017 (JP) .............................. JP2017-236934

(51) Int. Cl.
*H04N 1/00* (2006.01)
*G06F 3/12* (2006.01)

(52) U.S. Cl.
CPC ....... *H04N 1/00408* (2013.01); *G06F 3/1204* (2013.01); *G06F 3/1255* (2013.01); *H04N 1/0049* (2013.01); *H04N 1/00915* (2013.01); *G06F 3/1238* (2013.01); *G06F 3/1239* (2013.01)

(58) Field of Classification Search
None
See application file for complete search history.

(56) References Cited

U.S. PATENT DOCUMENTS

| 8,769,170 | B2 | 7/2014 | Miyasaka et al. | |
|---|---|---|---|---|
| 2006/0197978 | A1* | 9/2006 | Kishimoto | H04N 1/00915 358/1.15 |
| 2007/0220475 | A1* | 9/2007 | Asahara | G03G 15/5087 716/116 |
| 2012/0287469 | A1* | 11/2012 | Tomiyasu | H04N 1/00954 358/1.15 |
| 2015/0046879 | A1* | 2/2015 | Orimoto | G06K 15/005 715/835 |
| 2018/0316805 | A1* | 11/2018 | Hanada | H04N 1/00413 |

FOREIGN PATENT DOCUMENTS

| JP | 2010-154039 A | 7/2010 |
|---|---|---|
| JP | 2012-061713 A | 3/2012 |

* cited by examiner

*Primary Examiner* — Miya J Williams
(74) *Attorney, Agent, or Firm* — Oliff PLC

(57) ABSTRACT

An information processing apparatus includes a receiving unit that receives operation on an operator displayed on a screen for operation; and a controller that, in a case where there is a difference between information on a managed setting concerning a process registered in the operator and information for notification of the setting displayed in association with the operator, suspends execution of the process and presents information indicative of the difference.

19 Claims, 20 Drawing Sheets

FIG. 7A
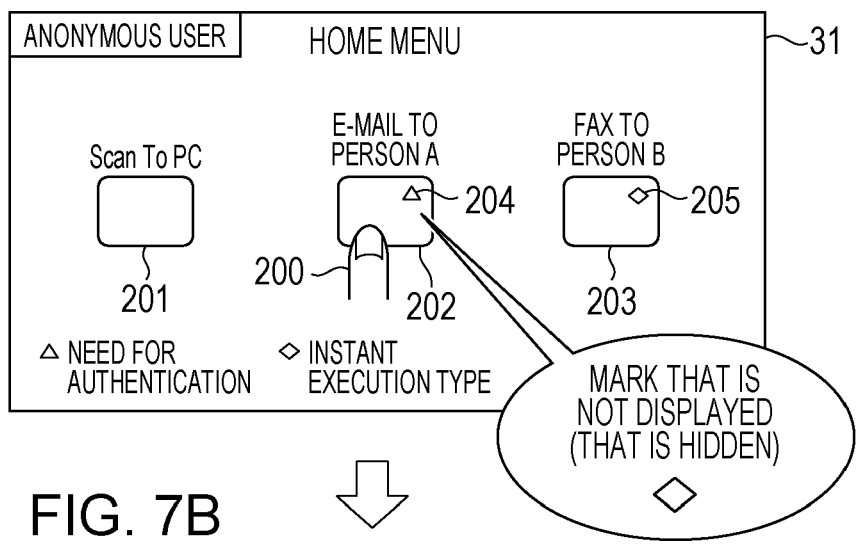
FIG. 7B
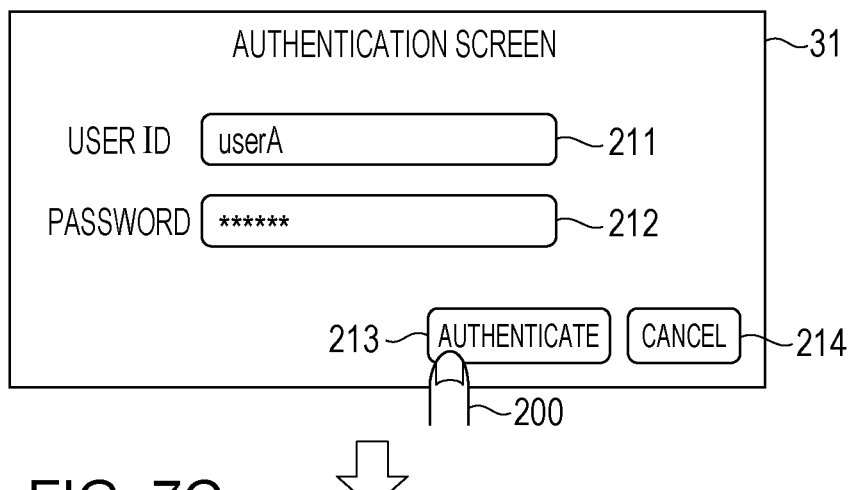
FIG. 7C
EXECUTE E-MAIL TRANSMISSION TO PERSON A FIG. 8A
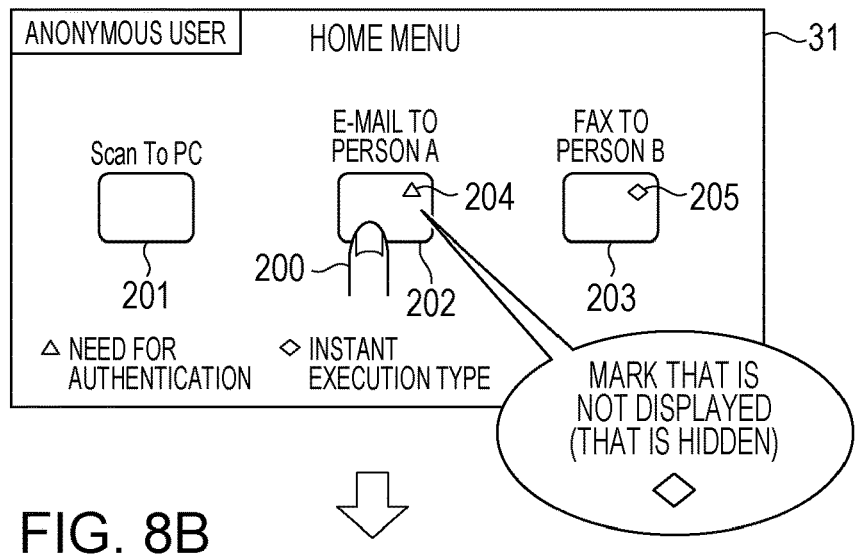
FIG. 8B
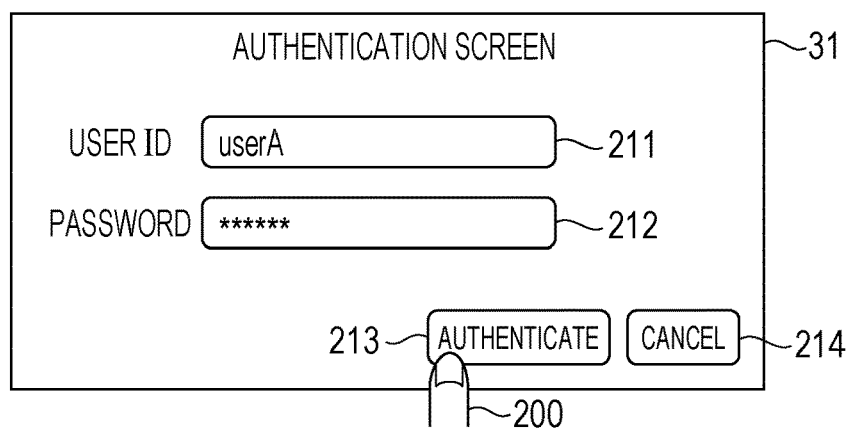
FIG. 8C
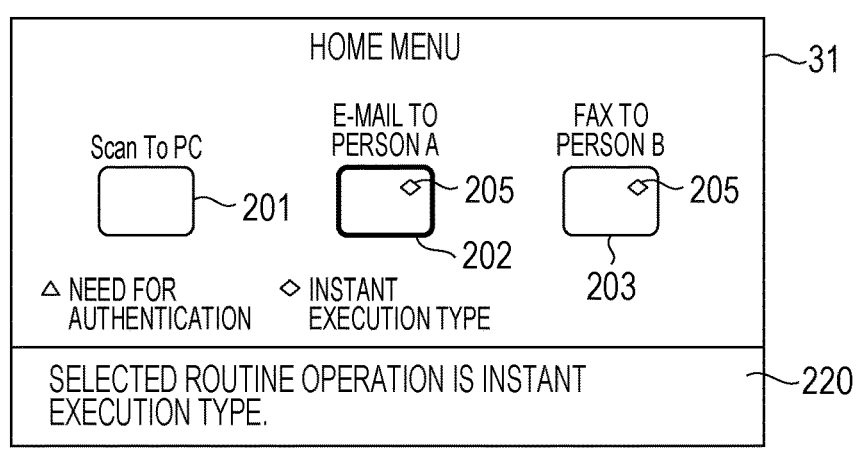
FIG. 8D
TRANSMIT E-MAIL FIVE SECONDS LATER

FIG. 9D ⇩

EXECUTE COPYING FIVE SECONDS LATER

FIG. 10A
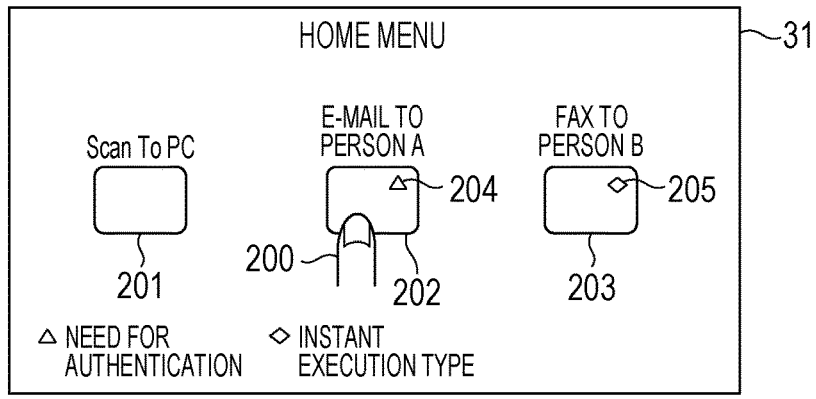
FIG. 10B
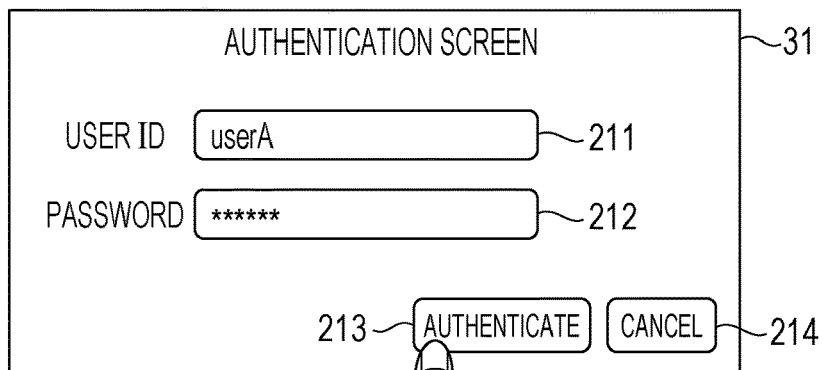
FIG. 10C
CHANGE MANAGED SETTING (NEED FOR AUTHENTICATION → NEED FOR AUTHENTICATION + INSTANT EXECUTION TYPE)
FIG. 10D
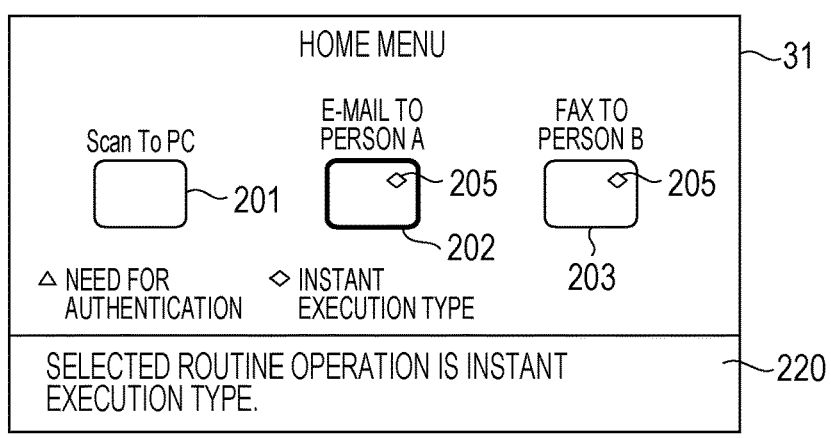
FIG. 10E
TRANSMIT E-MAIL FIVE SECONDS LATER FIG. 11A
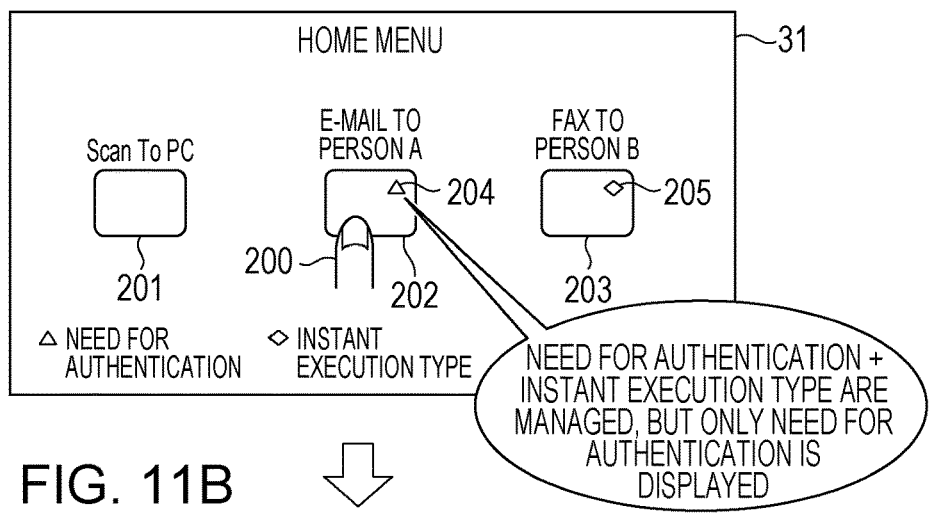
FIG. 11B ⇩
UPDATE OF DISPLAYED SETTING (NEED FOR AUTHENTICATION → NEED FOR AUTHENTICATION + INSTANT EXECUTION TYPE)
FIG. 11C ⇩
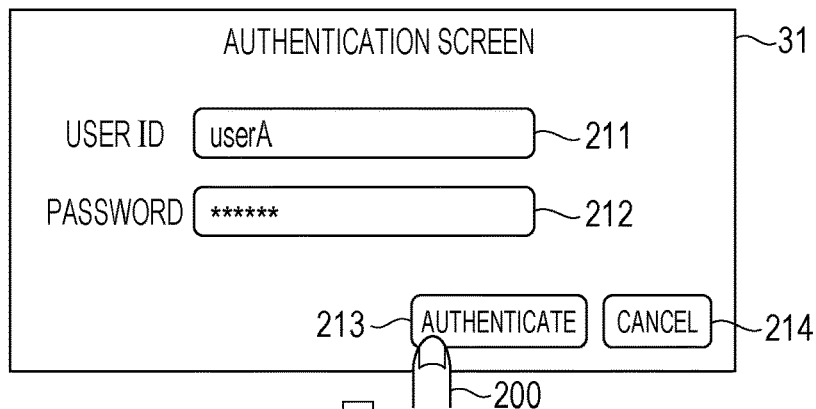
FIG. 11D ⇩
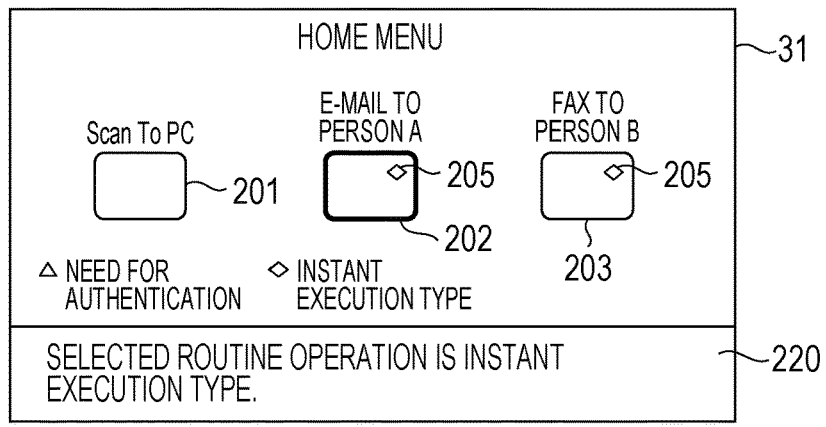
FIG. 11E ⇩
TRANSMIT E-MAIL FIVE SECONDS LATER FIG. 12A
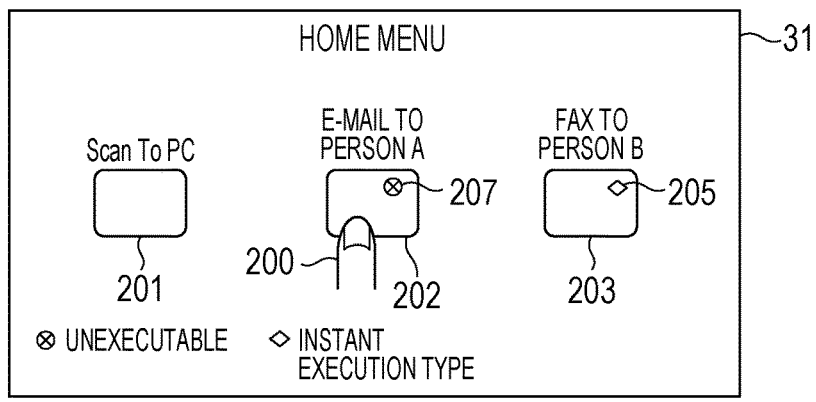
FIG. 12B ⇩
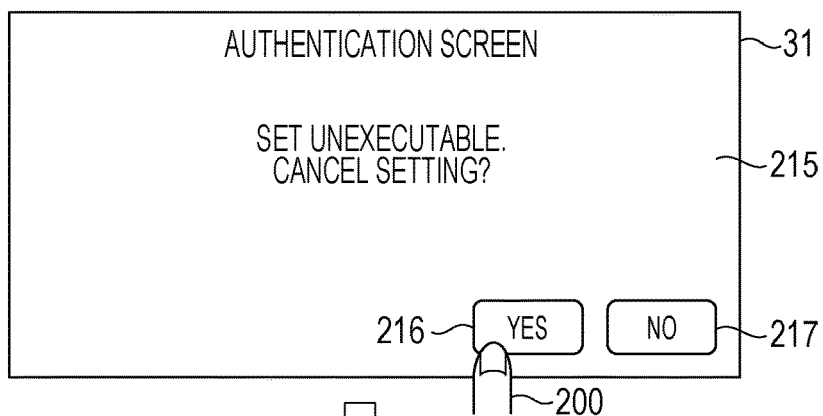
FIG. 12C ⇩
UPDATE MANAGED SETTING
(INSTANT EXECUTION: INACTIVE → INSTANT EXECUTION: ACTIVE)
FIG. 12D ⇩
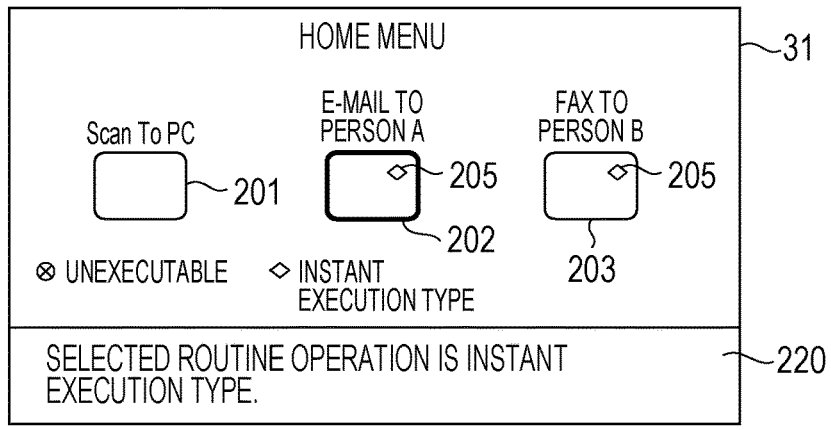
FIG. 12E ⇩
TRANSMIT E-MAIL FIVE SECONDS LATER

FIG. 13A
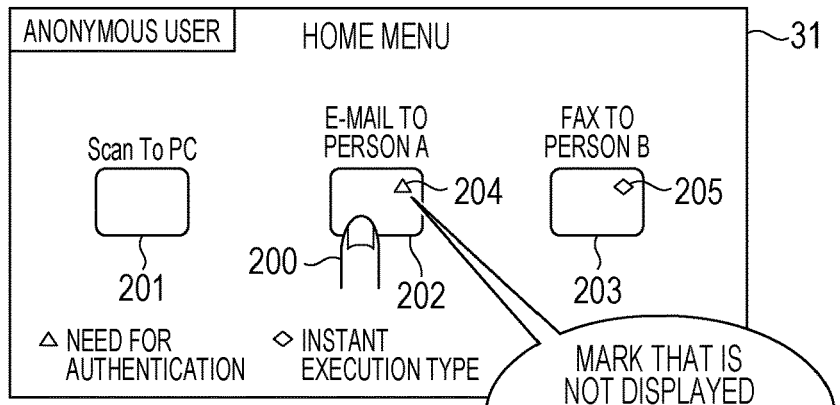
FIG. 13B
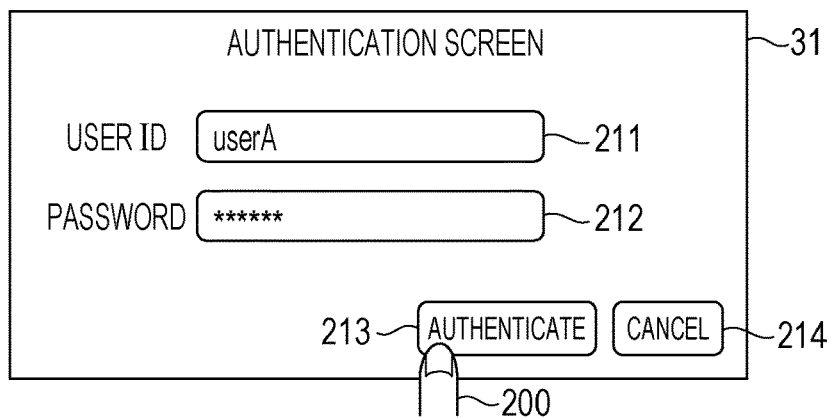
FIG. 13C
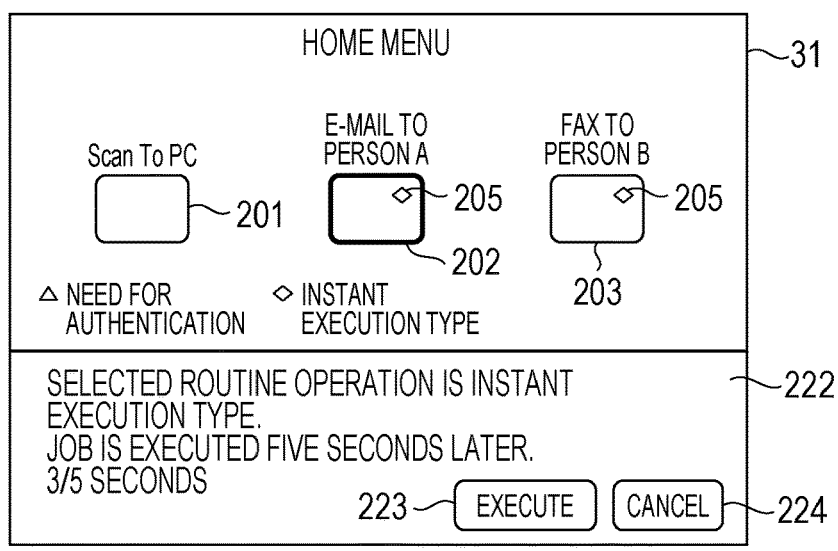
FIG. 13D
TRANSMIT E-MAIL FIVE SECONDS LATER OR BY OPERATION OF EXECUTION BUTTON FIG. 14A
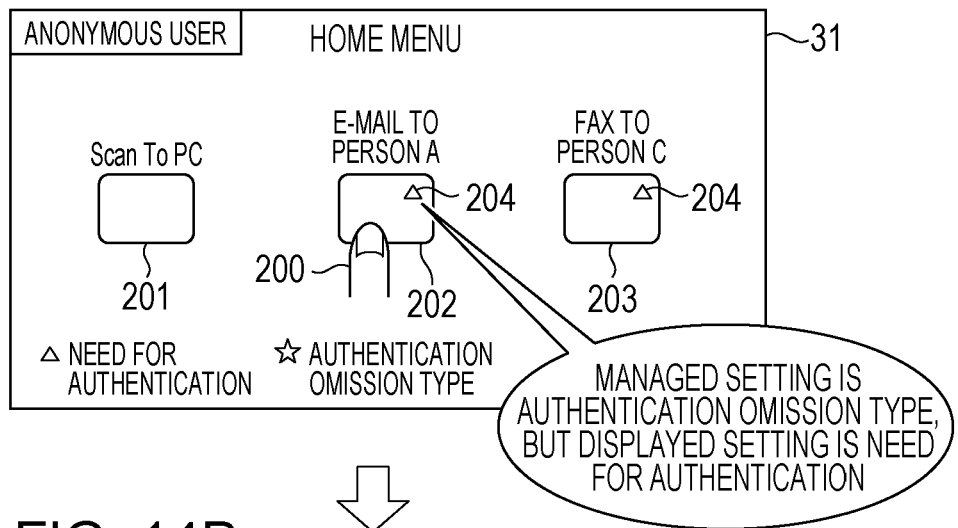
FIG. 14B
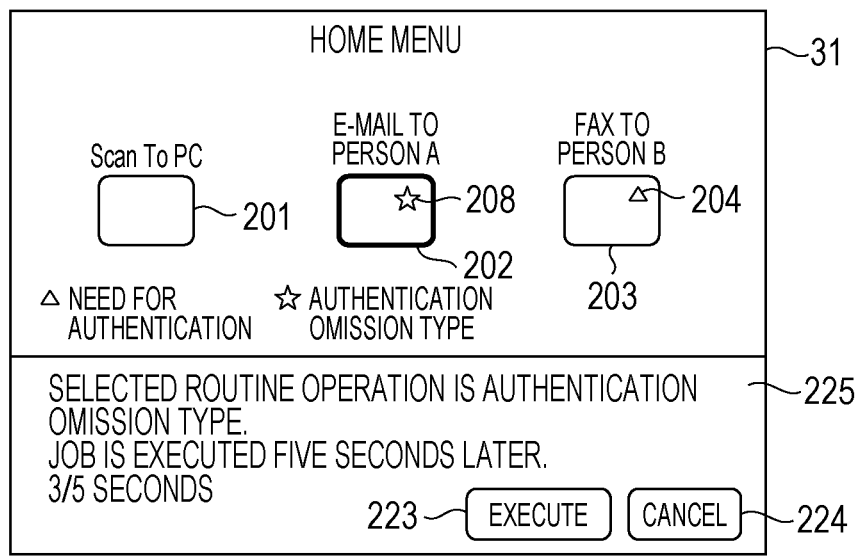
FIG. 14C
TRANSMIT E-MAIL FIVE SECONDS LATER OR BY OPERATION OF EXECUTION BUTTON FIG. 15A
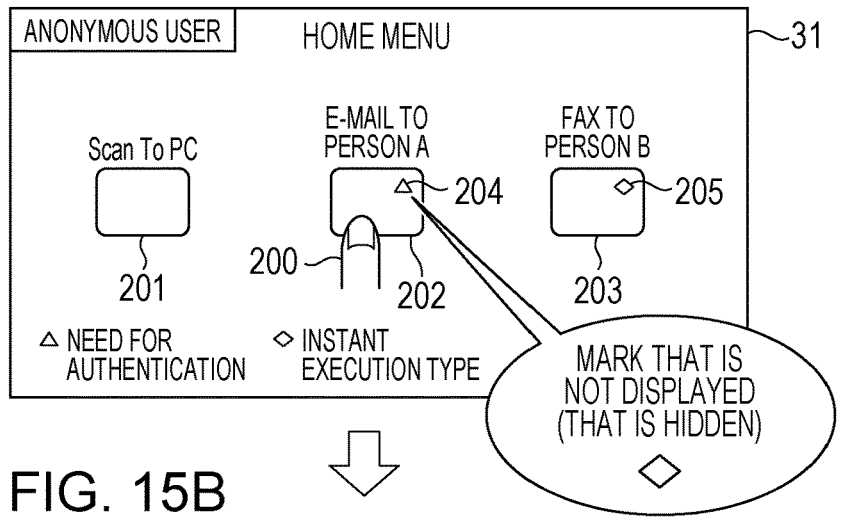
FIG. 15B
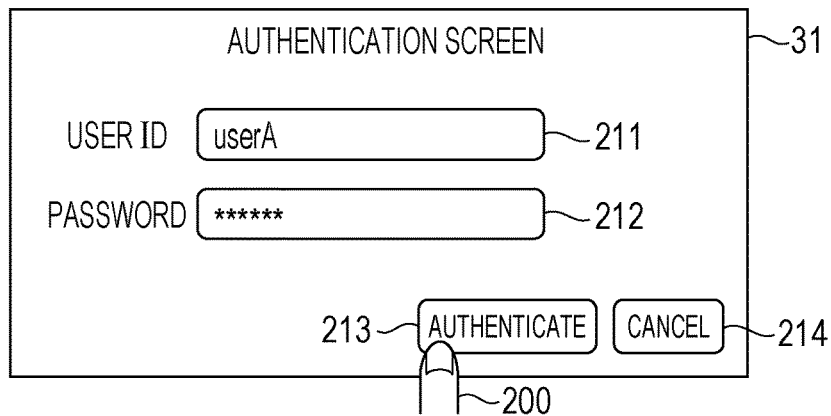
FIG. 15C
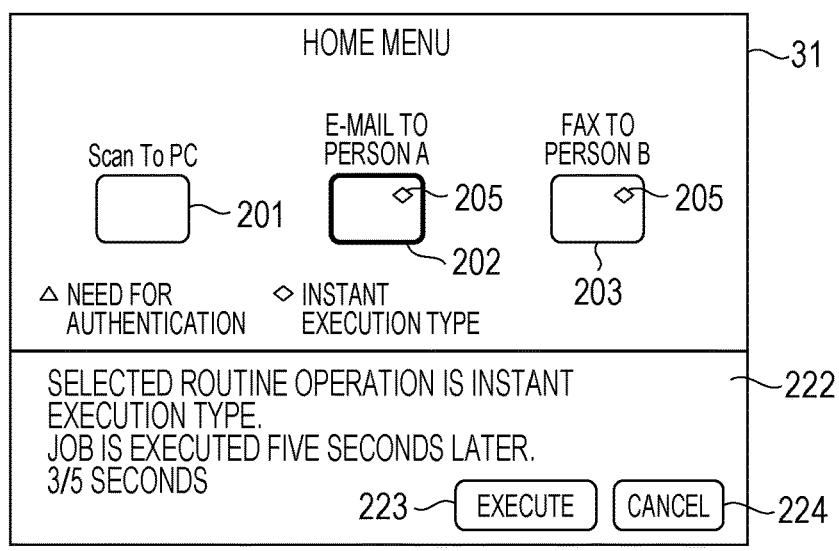
FIG. 15D
TRANSMIT E-MAIL FIVE SECONDS LATER OR BY OPERATION OF EXECUTION BUTTON

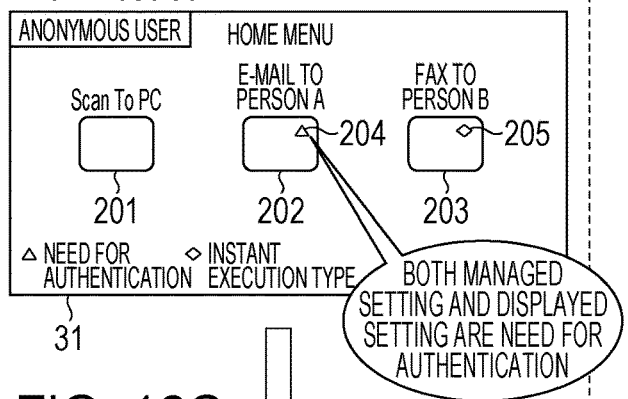
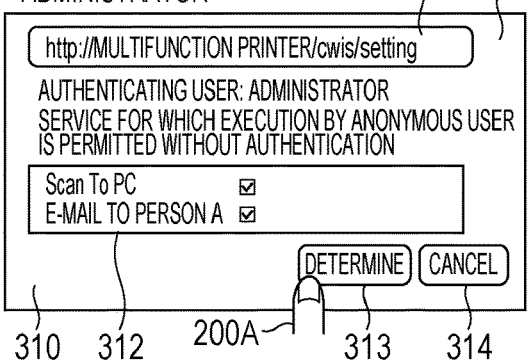
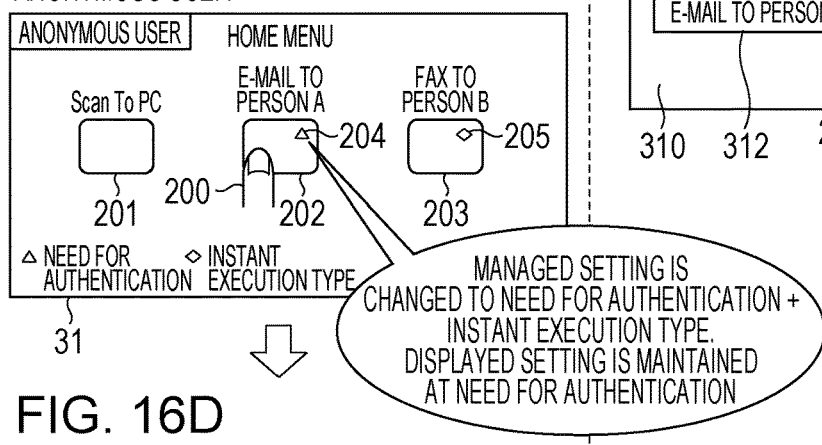
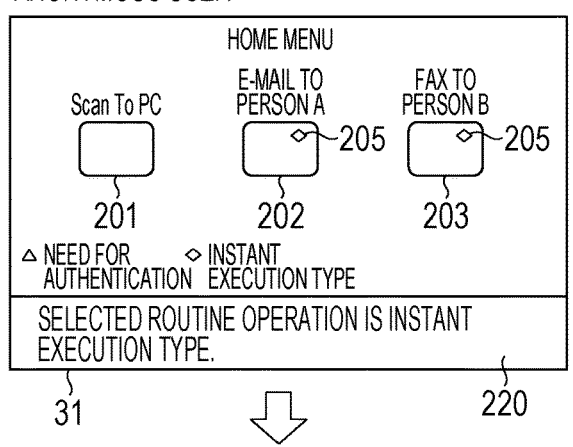

FIG. 17A
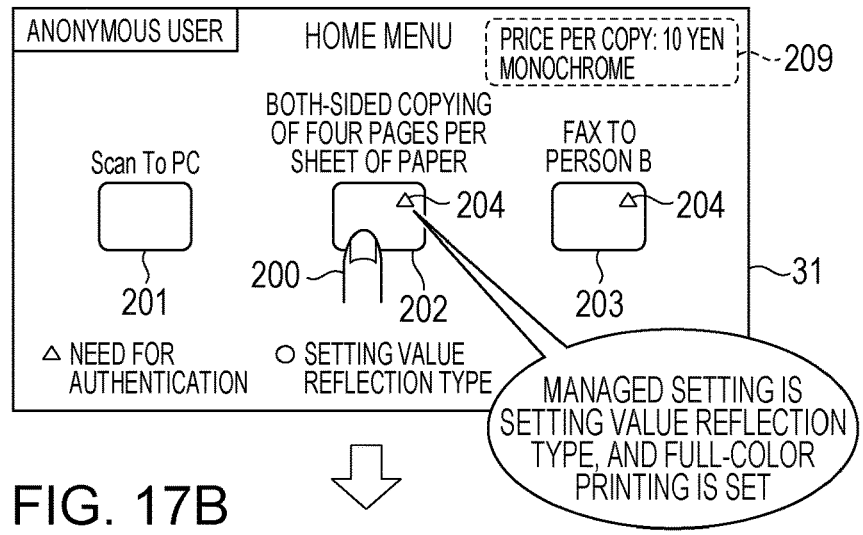
FIG. 17B
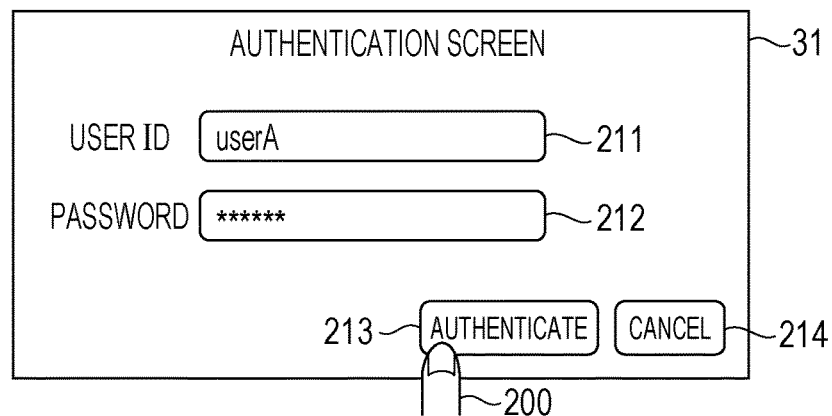
FIG. 17C
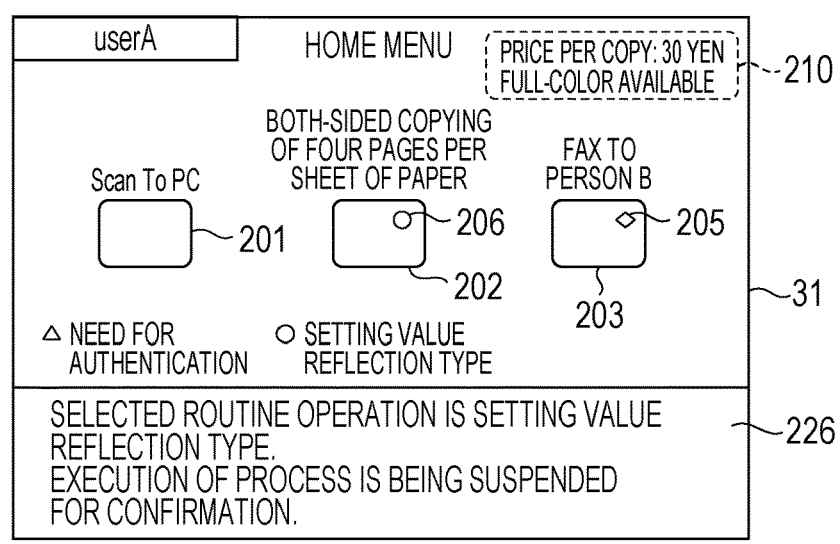
FIG. 17D
EXECUTE COPYING FIVE SECONDS LATER FIG. 20A
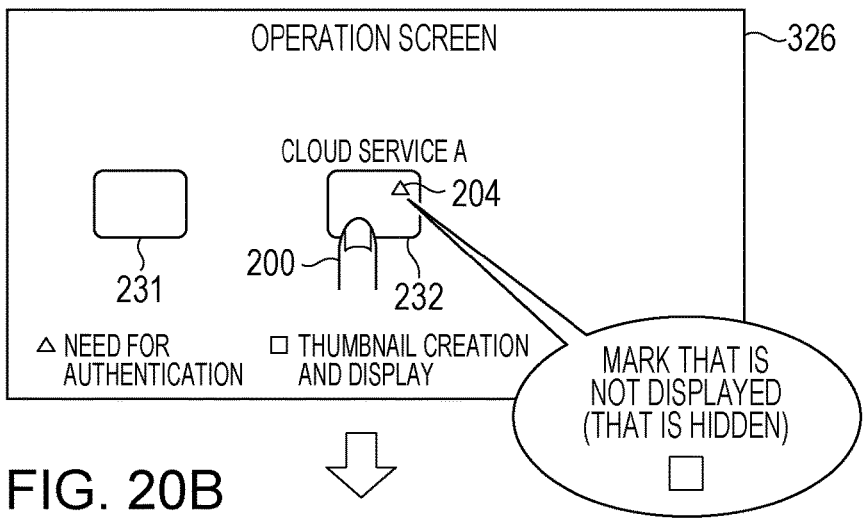
FIG. 20B
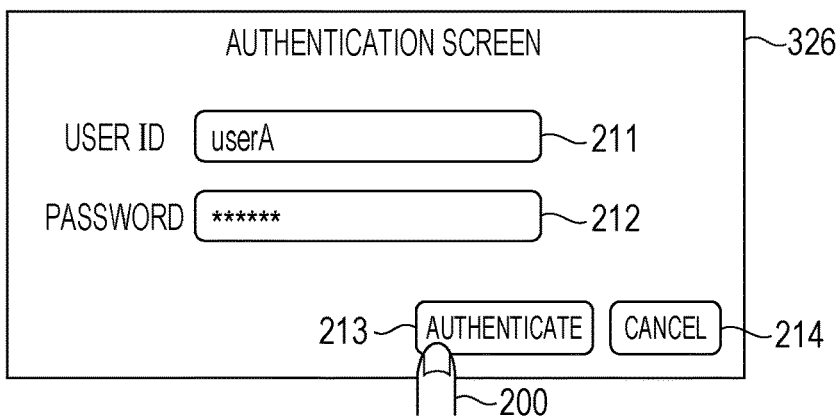
FIG. 20C
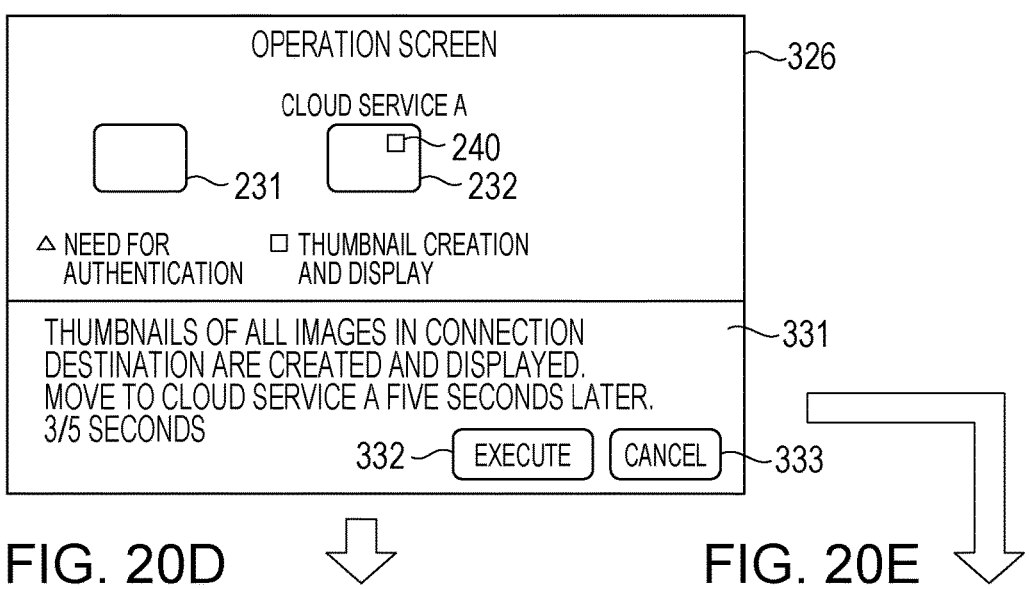
FIG. 20D
MOVE TO CLOUD SERVICE A FIVE SECONDS LATER
OR AFTER OPERATION OF EXECUTION BUTTON
FIG. 20E
DISPLAY HOME SCREEN AFTER
OPERATION OF CANCEL BUTTON

INFORMATION PROCESSING APPARATUS, IMAGE FORMING APPARATUS, AND NON-TRANSITORY COMPUTER READABLE MEDIUM FOR PROVIDING NOTICE OF INCONSISTENT SETTINGS

CROSS-REFERENCE TO RELATED APPLICATIONS

This application is based on and claims priority under 35 USC 119 from Japanese Patent Application No. 2017-236934 filed Dec. 11, 2017.

BACKGROUND

Technical Field

The present invention relates to an information processing apparatus, an image forming apparatus, and a non-transitory computer readable medium.

SUMMARY

According to an aspect of the invention, there is provided an information processing apparatus including: a receiving unit that receives operation on an operator displayed on a screen for operation; and a controller that, in a case where there is a difference between information on a managed setting concerning a process registered in the operator and information for notification of the setting displayed in association with the operator, suspends execution of the process and presents information indicative of the difference.

BRIEF DESCRIPTION OF THE DRAWINGS

Exemplary embodiments of the present invention will be described in detail based on the following figures, wherein:

FIGS. 7A through 7C are views for explaining a display example according to a comparative example, FIG. 7A illustrates a display example of a home menu, FIG. 7B illustrates an example of an authentication screen, and FIG. 7C illustrates an operation performed in a case where authentication succeeds;

FIGS. 8A through 8D are views for explaining a display example 1 using the service management function according to the first exemplary embodiment, FIG. 8A illustrates a display example of a home menu, FIG. 8B illustrates an example of an authentication screen, FIG. 8C illustrates an example of a notification screen after success of authentication, and FIG. 8D illustrates an executed operation;

FIGS. 9A through 9D are views for explaining a display example 2 using the service management function according to the first exemplary embodiment, FIG. 9A illustrates a display example of a home menu, FIG. 9B illustrates an example of an authentication screen, FIG. 9C illustrates an example of a notification screen after success of authentication, and FIG. 9D illustrates an executed operation;

FIGS. 10A through 10E are views for explaining a display example 3 using the service management function according to the first exemplary embodiment, FIG. 10A illustrates a display example of a home menu, FIG. 10B illustrates an example of an authentication screen, FIG. 10C illustrates a change of management data that occurs after user's operation, FIG. 10D illustrates an example of a notification screen after success of authentication, and FIG. 10E illustrates an executed operation;

FIGS. 11A through 11E are views for explaining a display example 4 using the service management function according to the first exemplary embodiment, FIG. 11A illustrates a display example of a home menu, FIG. 11B illustrates a change of management data that occurs after user's operation, FIG. 11C illustrates an example of an authentication screen, FIG. 11D illustrates an example of a notification screen after success of authentication, and FIG. 11E illustrates an executed operation;

FIGS. 12A through 12E are views for explaining a display example 5 using the service management function according to the first exemplary embodiment, FIG. 12A illustrates a display example of a home menu, FIG. 12B illustrates a setting screen, FIG. 12C illustrates update of management data caused by a change of a setting, FIG. 12D illustrates an example of a notification screen after update, and FIG. 12E illustrates an executed operation;

FIGS. 13A through 13D are views for explaining a display example 6 using the service management function according to the first exemplary embodiment, FIG. 13A illustrates a display example of a home menu, FIG. 13B illustrates an example of an authentication screen, FIG. 13C illustrates an example of a notification screen after success of authentication, and FIG. 13D illustrates an executed operation;

FIGS. 14A through 14C are views for explaining a display example 7 using the service management function according to the first exemplary embodiment, FIG. 14A illustrates a display example of a home menu, FIG. 14B illustrates an example of a notification screen after user's operation, and FIG. 14C illustrates an executed operation;

FIGS. 15A through 15D are views for explaining a display example 8 using the service management function according to the first exemplary embodiment, FIG. 15A illustrates a display example of a home menu, FIG. 15B illustrates an example of an authentication screen, FIG. 15C illustrates an example of a notification screen after success of authentication, and FIG. 15D illustrates an executed operation;

FIGS. 16A through 16F are views for explaining a display example 9 using the service management function according to the first exemplary embodiment, FIG. 16A illustrates a display example of a home menu, FIG. 16B illustrates an operation screen for an administrator, FIG. 16C illustrates a display example of a home menu after operation of an administrating user, FIG. 16D illustrates execution of an authentication process, FIG. 16E illustrates an example of a notification screen after operation of an anonymous user, and FIG. 16F illustrates an executed operation;

FIGS. 17A through 17D are views for explaining a display example 10 using the service management function according to the first exemplary embodiment, FIG. 17A illustrates a display example of a home menu, FIG. 17B illustrates an example of an authentication screen, FIG. 17C illustrates an example of a notification screen after success of authentication, and FIG. 17D illustrates an executed operation;

FIGS. 20A through 20E are views for explaining a display example using the service management function according to the second exemplary embodiment, FIG. 20A illustrates a display example of an operation screen, FIG. 20B illustrates an example of an authentication screen, FIG. 20C illustrates an example of a notification screen after success of authentication, FIG. 20D illustrates an operation performed in a case where a button for execution is operated, and FIG. 20E illustrates an operation performed in a case where a button for cancelling is operated.

DETAILED DESCRIPTION

Exemplary embodiments are described in detail below with reference to the attached drawings.

First Exemplary Embodiment

In the present exemplary embodiment, an image forming apparatus that is an example of an information processing apparatus is described. The image forming apparatus described in the present exemplary embodiment is an apparatus for forming an image on a recording material (hereinafter sometimes referred to as a "sheet of paper") and has functions such as a copy function, a scanner function, a facsimile transmitting receiving function, and a printing function. The image forming apparatus need not have all of these functions and may be an apparatus specialized for any one of the functions, such as a copying machine, a scanner (including a three-dimensional scanner), a facsimile transmitter and receiver, or a printer (including a three-dimensional printer).

Configuration of Apparatus

Figure 1:
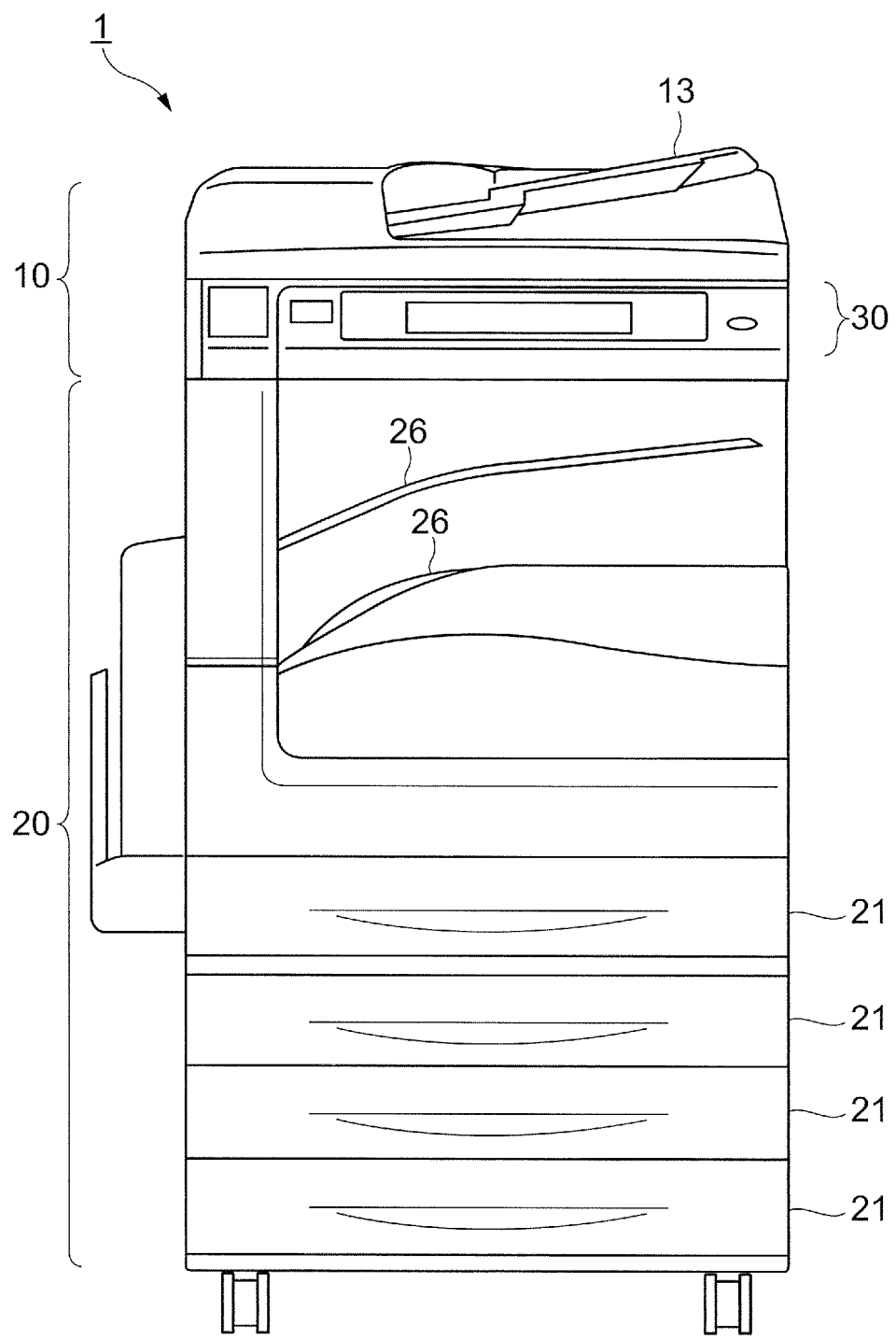
FIG. 1 illustrates an example of external appearance of an image forming apparatus used in a first exemplary embodiment.
Figure 2:
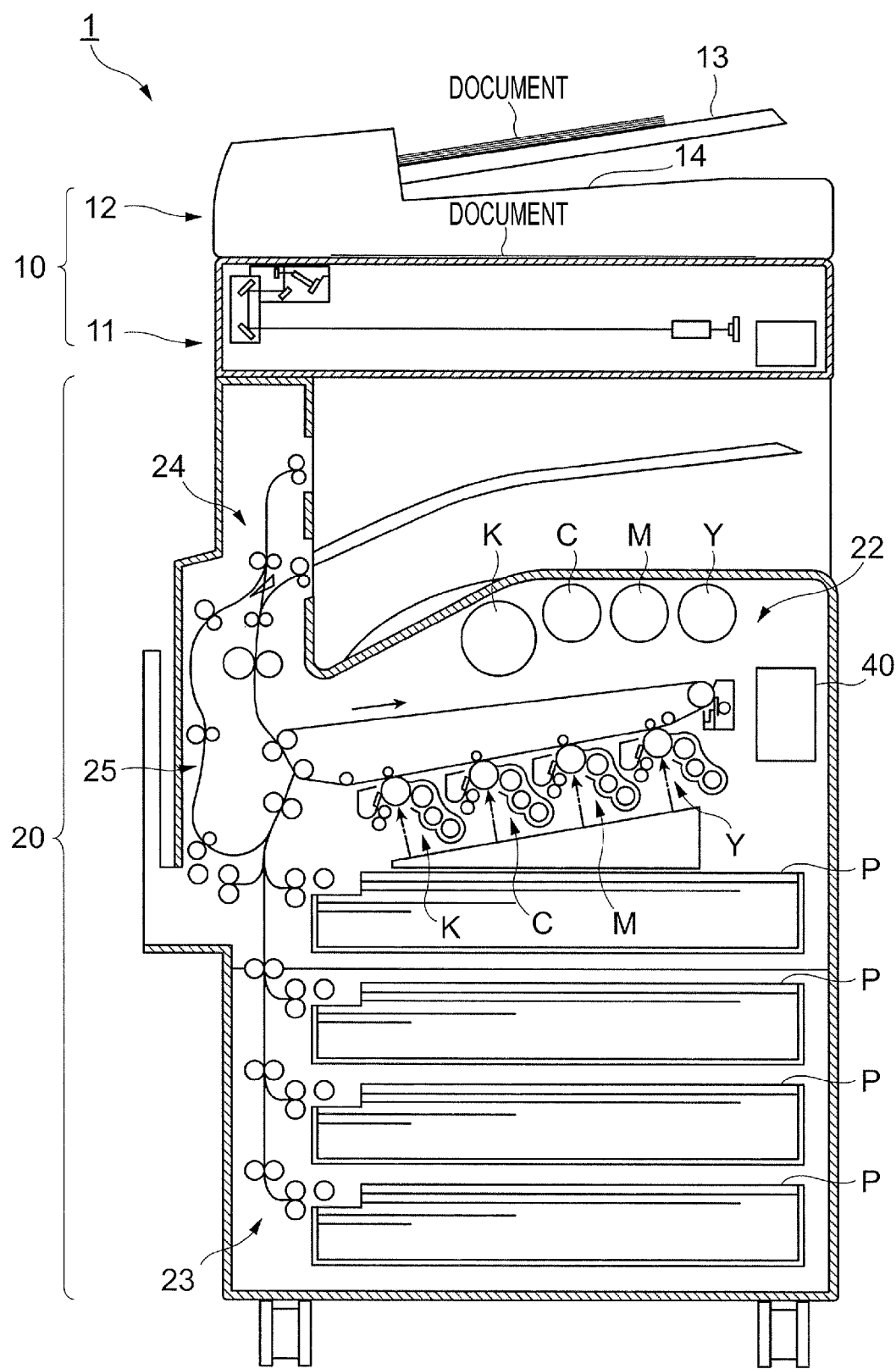
FIG. 2 illustrates an example of an internal structure of the image forming apparatus used in the first exemplary embodiment.

FIG. 1 illustrates an example of external appearance of an image forming apparatus 1 used in the first exemplary embodiment. FIG. 2 illustrates an example of an internal structure of the image forming apparatus 1 used in the first exemplary embodiment. The image forming apparatus 1 includes an image reading device 10 that reads an image of a document and an image recording device 20 that records an image onto a sheet of paper. Furthermore, the image forming apparatus 1 includes a user interface (UI) 30 used to receive user's operation and present various kinds of information to the user. Furthermore, the image forming apparatus 1 includes a control device 40 that controls a whole operation of the image forming apparatus 1. The image recording device 20 is an example of an image forming unit, and the control device 40 is an example of an information processing apparatus.

The image reading device 10 is attached on a top part of the image recording device 20 that constitutes a body of the apparatus. The image reading device 10 includes an image reading unit 11 that optically reads an image formed on a document and a document transporting unit 12 that transports a document to the image reading unit 11. The document transporting unit 12 includes a document container unit 13 in which a document is contained and a document ejection unit 14 to which a document drawn out from the document container unit 13 is ejected, and the document transporting unit 12 transports a document from the document container unit 13 to the document ejection unit 14 by using a transporting mechanism (not illustrated). The document transporting unit 12 is also called an auto document feeder (ADF). Note that it is also possible to read an image on a document by moving a reading optical system relative to the document.

The image recording device 20 includes members such as a mechanical unit that forms an image on a sheet of paper and a mechanical unit that transports a sheet of paper. The image recording device 20 includes an image forming unit 22 that forms an image on a sheet of paper P drawn out from a paper tray 21, a paper feeding unit 23 that feeds the sheet of paper P to the image forming unit 22, a paper ejection unit 24 that ejects the sheet of paper P on which an image has been formed by the image forming unit 22, and a reversing transporting unit 25 that reverses the sheet of paper P output from the image forming unit 22 and transports the sheet of paper P to the image forming unit 22 again. The image forming unit 22 has recording units for respective colors of yellow (Y), magenta (M), cyan (C), and black (K) along a path on which the sheet of paper P is transported.

Each of the recording units includes, for example, a photoconductor drum, a charging unit that charges a surface of the photoconductor drum, an exposure unit that draws an image by irradiating the charged photoconductor drum with laser light, a developer that develops the drawn image as a toner image, and a transfer unit that transfers the toner image onto a transfer belt. Toner images corresponding to the respective colors transferred onto the transfer belt are finally transferred onto a surface of the sheet of paper P and fixed onto the sheet of paper P by a fixing unit. Note that the kinds of colors and the combination of colors are examples. The paper tray 21 on which the sheet of paper P is contained is disposed in a lower part of the image recording device 20. Plural exit trays 26 that eject the sheet of paper P on which an image has been formed are provided in an upper part of the image recording device 20.

The user interface 30 is disposed on a near side of the image reading device 10 so that an operation surface of the user interface 30 faces a user operating the image forming apparatus 1. The user interface 30 has an operation receiving unit that receives an instruction from a user and a display that presents information to the user. The operation receiving unit has functions such as a function of detecting operation, for example, on a hardware key or a software key. The hardware key disposed as a physical button and the software key that is a button displayed on the display are examples of a function button. The software key is also an example of an operation button. The display displays, for example, a screen for operation and a software key.

Figure 3:
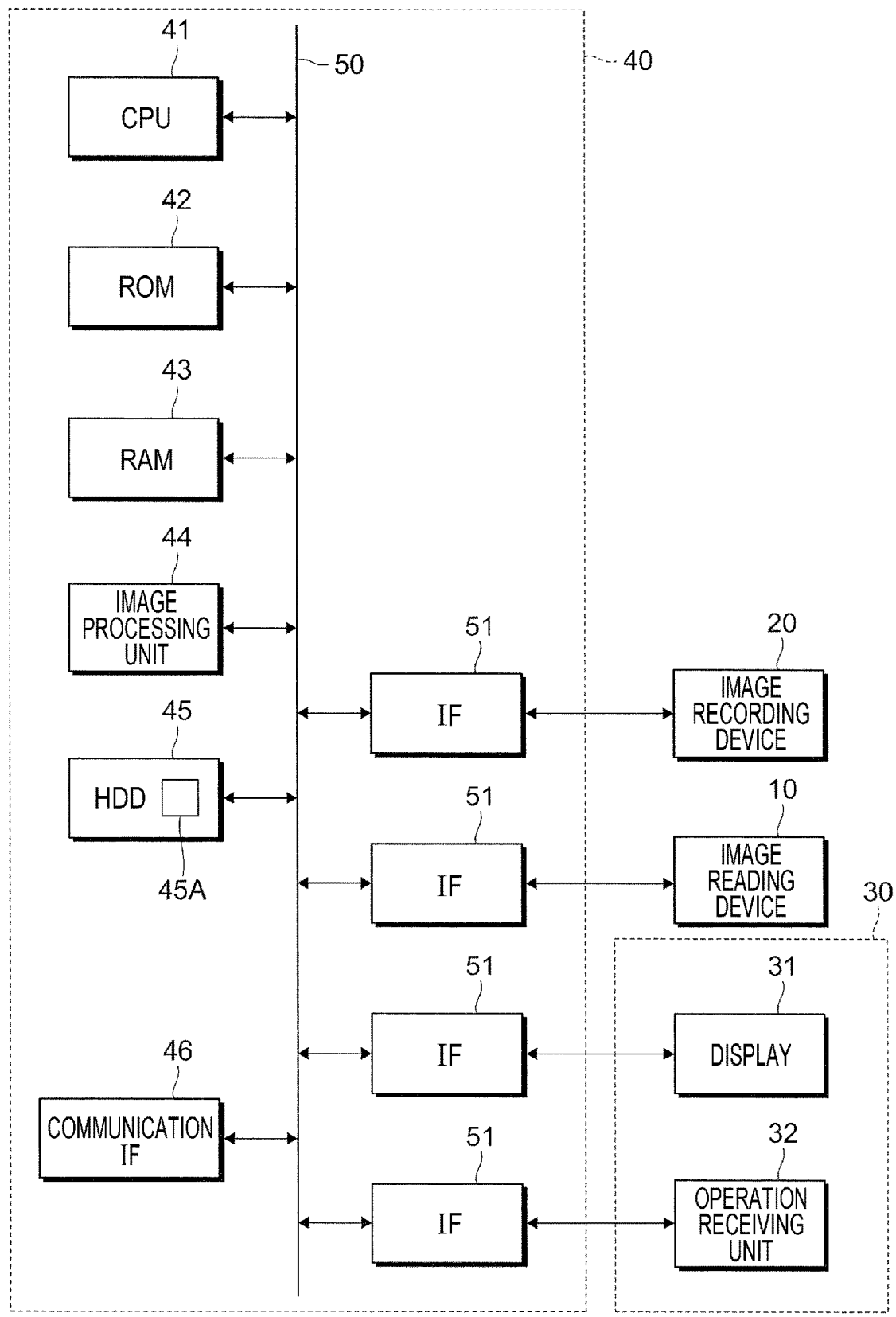
FIG. 3 is a view for explaining a connection relation between a control device and other constituent parts.

The control device 40 is provided in a housing of the image recording device 20. FIG. 3 is a view for explaining a connection relation between the control device 40 and other constituent elements. The control device 40 includes a central processing unit (CPU) 41, a read only memory (ROM) 42 in which firmware, a basic input output system (BIOS), and the like are stored, and a random access memory (RAM) 43 used as a work area of the CPU 41, and these members constitute a general computer. The control device 40 is an example of a controller.

Furthermore, the control device 40 includes an image processing unit 44 that performs various processes (e.g., color correction and tone correction) necessary for formation of an image. The image processing unit 44 performs image processing, for example, by using the RAM 43. Furthermore, the control device 40 includes a hard disk drive (HDD) 45 that is an example of a non-volatile storage device. The HDD 45 stores therein images such as an image read by the image reading device 10, an image formed on the sheet of paper P by using the image recording device 20, and an image transmitted and received by facsimile. In the present exemplary embodiment, the HDD 45 stores therein a routine operation holding database 45A for holding routine operations registered in a function button and an operation button. The operation button is an example of an operator displayed on the screen for operation.

The control device 40 has a communication interface (communication IF) 46 that communicates with an external apparatus over a LAN and an interface (IF) 51 used for connection with each unit in the device. The CPU 41 and each unit are connected through a bus 50. The bus 50 may be plural buses connected through a bridge. In FIG. 3, a display 31 used for display of an operation screen and an operation receiving unit 32 that receives user's operation are also illustrated as examples of elements that constitute the user interface 30. The operation receiving unit 32 is an example of a receiving unit. For example, a touch panel is used as the operation receiving unit 32.

Service Management Function

Figure 4:
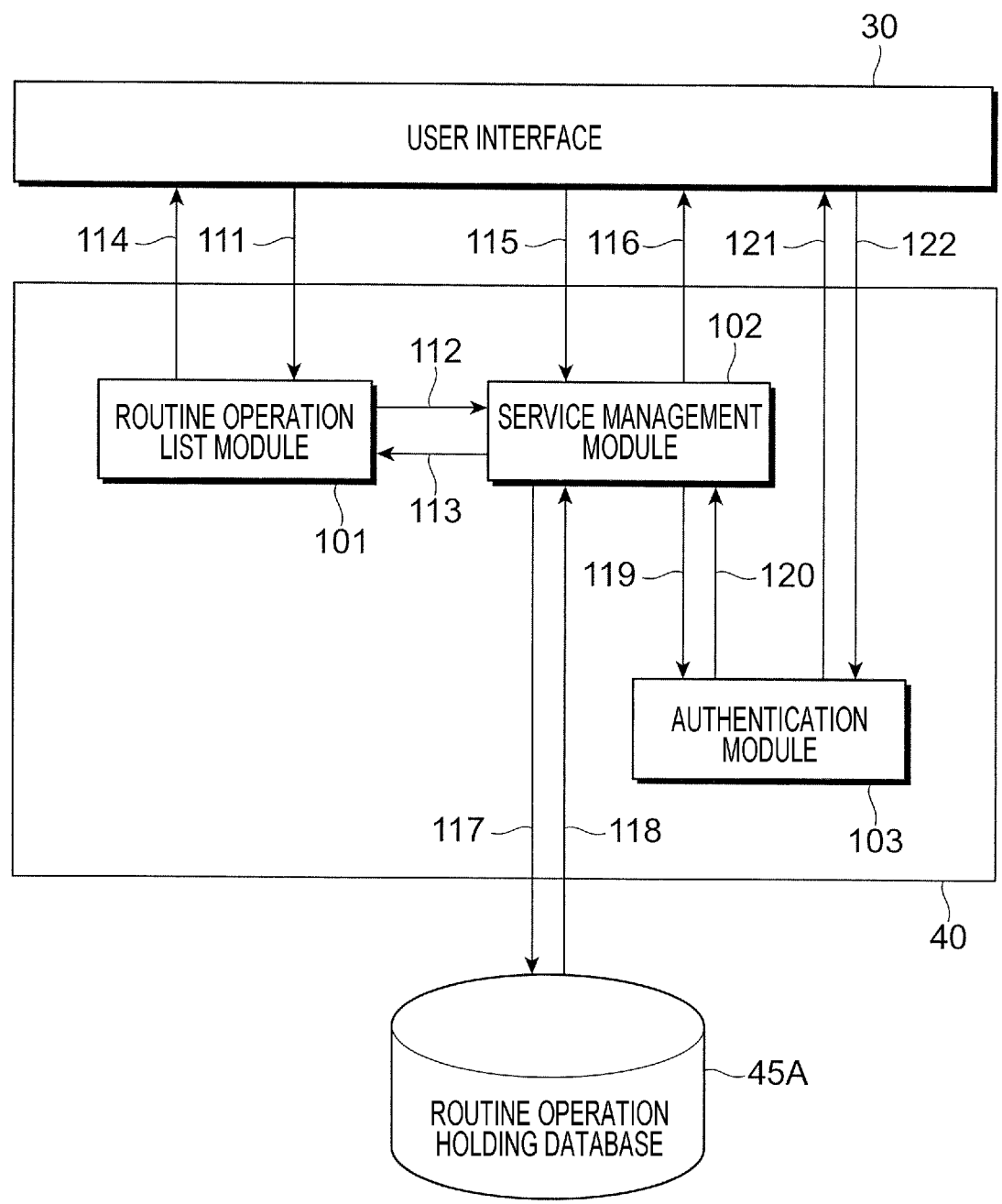
FIG. 4 illustrates an example of a functional configuration concerning a service management function.

FIG. 4 illustrates an example of a functional configuration concerning a service management function. The service management function is offered through execution of a corresponding program. In the present exemplary embodiment, the service management function is a function of managing display of a home menu including an operation button, receipt of user's operation, offer of a corresponding service, and the like. The home menu is an example of an operation screen and is also called a top menu. In the present exemplary embodiment, a hardware key or a software key to which a specific job, function, service, or the like is allocated is referred to as a function button. A software key is referred to as an operation button when distinguished from a hardware key.

In the present exemplary embodiment, a process (job) registered in a function button (including an operation button) is also referred to as a routine operation. In other words, the routine operation is an example of a process registered in a function button. Examples of the registered process include selection for offer of a specific function or service and setting of a variable (parameter). A list of operation buttons displayed on the home menu corresponds to a list of routine operations.

The service management function illustrated in FIG. 4 has a routine operation list module 101 for displaying a list of routine operations on the display 31 (see FIG. 3), a service management module 102 for managing offer of a service, and an authentication module 103 for execution of user authentication. The routine operation list module 101, the service management module 102, and the authentication module 103 are provided through execution of programs (firmware, application programs) stored in the HDD 45 (see FIG. 3).

The routine operation list module 101 receives a request to display a home menu from the user interface 30 (111). The routine operation list module 101 requests the service management module 102 to provide information displayed on the home menu at a predetermined timing (112). This request is executed independently of the request to display a home menu from the user interface 30. The routine operation list module 101 acquires information displayed on the home menu from the service management module 102 (113). The routine operation list module 101 generates an image of the home menu and displays the image of the home menu on the display 31 (see FIG. 3) (114). In a case where information registered in a function button that constitutes the home menu is changed, the service management module 102 requests the routine operation list module 101 to update the home menu (113).

The information displayed on the home menu includes contents of a setting concerning execution of a routine operation registered in an operation button. The contents of a setting include, for example, a condition of execution, a kind of execution, and the like. In the present exemplary embodiment, for example, a demand for authentication before execution (need for authentication), omission of entry or confirmation before execution (instant execution), use of a predetermined value or predetermined selection in execution (setting value reflection), no need for authentication before execution (authentication omission), and an unexecutable state (unexecutable) are prepared. Plural settings can be registered in a single routine operation.

Contents of a setting are expressed, for example, by a figure, a symbol (mark), a text, or a color in a manner associated with an operation button. The expression "associated" refers to a state where relevance with an operation button is clear and includes, for example, being displayed within the operation button, being displayed around the operation button, and being displayed as a change of a color or form of the operation button. In the present exemplary embodiment, a symbol is used to display contents of a setting. The symbol is an example of information for notification about a setting.

In the present exemplary embodiment, only one symbol is displayed in a region where a single operation button is displayed. In a case where plural settings are registered in a single operation button, there is a symbol that is not displayed on the home menu. In this case, which symbol is displayed and which symbol is not displayed are determined in advance. In the present exemplary embodiment, a symbol representative of need for authentication that involves displaying of a screen for operation after user's operation is displayed in preference to other symbols. The routine operation list module 101 creates a home menu including these pieces of information.

The service management module 102 receives a request to register a routine operation from the user interface 30 (115). The service management module 102 generates an operation screen used for registration of a routine operation and various operation screens related to execution of a job and supplies these operation screens to the user interface 30 (116). The service management module 102 controls progress of an individual process (job). For example, the service management module 102 controls progress of a process (job) registered in an operation button on the basis of a relevant setting.

The service management module 102 registers a routine operation in the routine operation holding database 45A (117) and reads out a routine operation from the routine operation holding database 45A (118). The routine operation holding database 45A also stores therein contents of a setting concerning execution of an individual routine operation. The setting is an example of information on a managed setting. Furthermore, the service management module 102 requests an authentication screen from the authentication module 103 (119). Furthermore, the service management module 102 receives a result of authentication from the authentication module 103 (120). The authentication module 103 displays an authentication screen on the user interface 30 (121). Furthermore, the authentication module 103 receives entry of information necessary for authentication from the user interface 30 (122).

Processing Operation

Figure 5:
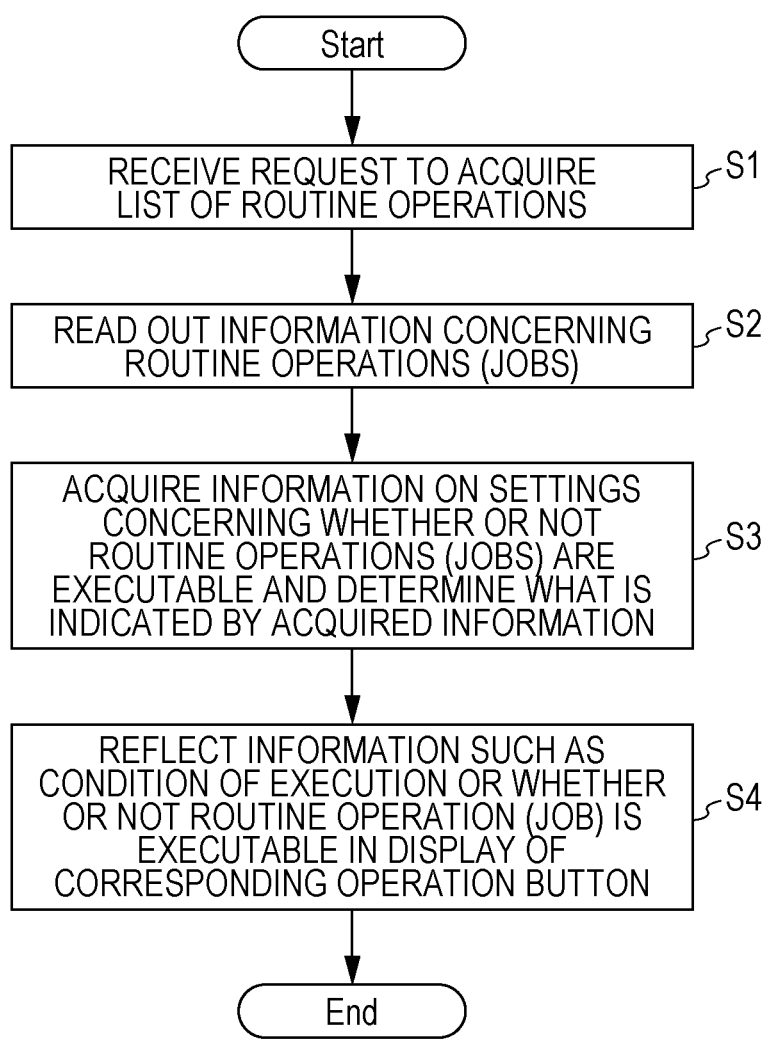
FIG. 5 is a flowchart illustrating an example of a processing operation performed in a case where a list of routine operations is displayed on a home menu.

The following describes a processing operation performed in a case where a list of routine operations is displayed on the home menu and a processing operation performed in a case where an operation button is operated. FIG. 5 is a flowchart illustrating an example of a processing operation performed in a case where a list of routine operations is displayed on the home menu. This processing operation is performed by the routine operation list module 101 (see FIG. 4). First, the routine operation list module 101 receives a request to acquire a list of routine operations from the user interface 30 (Step 1). The request to acquire the list of routine operations is, for example, a request to display the home menu.

Next, the routine operation list module 101 reads out information on routine operations from a storage region of the module (Step 2). Then, the service management module 102 acquires information on settings concerning whether or not the routine operations are executable from the information on the routine operations thus read out and determines what is indicated by the information (Step 3). Specifically, the service management module 102 determines a condition of execution or whether or not a routine operation is executable.

Next, the service management module 102 reflects the information on a setting such as a condition of execution or whether or not a routine operation is executable in display of a corresponding operation button (Step 4). The condition of execution is, for example, necessity of authentication. In the present exemplary embodiment, a case where authentication is needed is referred to as "need for authentication". Whether or not a routine operation is executable is, for example, whether or not a process is executed without displaying a screen for entry or confirmation after user's operation. An "instant execution type" is an example of a process that does not need display of a screen for entry or confirmation.

Figure 6:
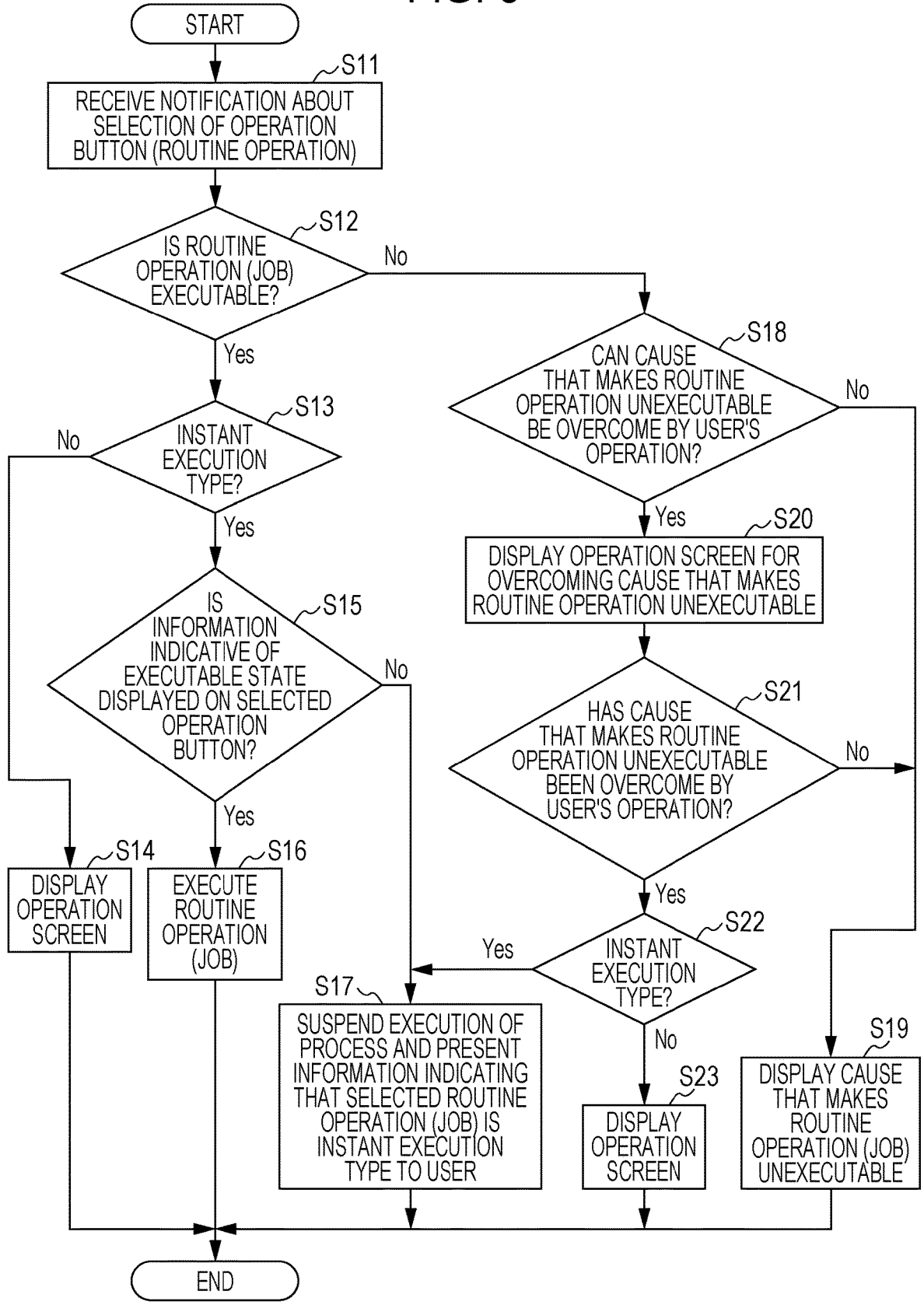
FIG. 6 is a flowchart illustrating an example of a processing operation performed in a case where an operation button is operated.

FIG. 6 is a flowchart illustrating an example of a processing operation performed in a case where an operation button is operated. This processing operation is executed by the service management module 102 (see FIG. 4). First, the service management module 102 receives a notification about selection of an operation button (a routine operation) from the user interface 30 (Step 11). The service management module 102 determines whether or not the selected routine operation (job) is executable at a current time (Step 12).

In a case where a positive result is obtained in Step 12, the service management module 102 determines whether or not the selected routine operation (job) is an instant execution type (Step 13). In a case where a negative result is obtained in Step 13 (in a case where the routine operation is executable but is not set as an instant execution type), the service management module 102 displays an operation screen prepared for the selected routine operation (job) (Step 14). In this example, an operation screen prepared for a job corresponding to the routine operation is displayed. For example, a screen for receiving detailed settings concerning copying is displayed.

In a case where a positive result is obtained in Step 13, the service management module 102 determines whether or not information indicative of an executable state is displayed on the selected operation button (Step 15). In other words, the service management module 102 checks whether or not a symbol indicative of an inexecutable state is displayed on the corresponding operation button. The service management module 102 acquires information on a displayed setting concerning the selected operation button through communication with the routine operation list module 101 (see FIG. 4).

One reason for providing Step 15 is that only one piece of information on a setting concerning the operation button is displayed and a user cannot notice the presence of a setting that is not displayed even in a case where such a setting is present. One cause of occurrence of a difference between a displayed setting and a managed setting is that information on settings registered in the routine operation holding database 45A is sometimes changed after a list of routine operations is created. The change may be executed in the background or may be caused by user's operation.

In a case where a positive result is obtained in Step 15 (in a case where a displayed setting and a managed setting are consistent), the service management module 102 executes the routine operation (job) (Step 16). In this case, a user knows that a process allocated to the operation button is instantly executed by operating the operation button, and an operation is executed as expected.

Meanwhile, in a case where a negative result is obtained in Step 15 (in a case where the displayed setting and the managed setting are different), the service management module 10 suspends execution of the process and presents information indicating that the selected routine operation (job) is an instant execution type to the user (Step 17). In the present exemplary embodiment, the presented information is displayed in a more noticeable manner (e.g., as a pop-up) than other displayed items (e.g., an operation button) on the home menu. The information may be presented by using sound. The presentation is an example of notification of information indicative of the difference. How to cancel suspension (execute the process) differs depending on a method of notification.

For example, in a case where no button that can be operated by the user is provided on a screen used for the notification, suspension is cancelled and a corresponding process is executed after elapse of a predetermined period. For example, in a case where a button that can be operated by the user is provided on the screen used for the notification, suspension is cancelled and the corresponding process is executed when the user operates the button used to give an instruction to execute the process. Even in a case where a button that can be operated by the user is displayed, suspension is cancelled and a corresponding process is executed after elapse of a predetermined period in a case where operation of the button is not detected within the predetermined period.

The following describes Step 12 again. In a case where a negative result is obtained in Step 12 (in a case where the selected routine operation is not executable), the service management module 102 determines whether or not a cause that makes the selected routine operation unexecutable can be overcome by user's operation (Step 18). A case where a cause that makes the selected routine operation unexecutable can be overcome by user's operation is, for example, a case where authentication is set as a condition of execution. In a case where a negative result is obtained in Step 18, the service management module 102 displays the cause that makes the selected routine operation (job) unexecutable on the display 31 (see FIG. 3) (Step 19). An example of this case is a case where an operation button to which no routine operation is allocated has been selected.

In a case where a positive result is obtained in Step 18, the service management module 102 displays an operation screen for overcoming the cause that makes the selected routine operation unexecutable (Step 20). For example, a screen for authentication is displayed. After the screen is displayed, the service management module 102 determines whether or not the cause that makes the selected routine operation unexecutable has been overcome by user's operation (Step 21). In a case where a negative result is obtained in Step 21, the service management module 102 shifts to Step 19 described above. An example of this case is a case where authentication has failed.

Meanwhile, in a case where a positive result is obtained in Step 21, the service management module 102 determines whether or not the routine operation is an instant execution type (Step 22). In a case where a positive result is obtained in Step 22 (in a case where the displayed setting and the managed setting are different), the service management module 102 shifts to Step 17 described above. This is because it cannot be confirmed from the displayed setting that the routine operation is an instant execution type. Furthermore, a case where an instant execution type function that has been made inactive because of the cause that makes the selected routine operation unexecutable becomes active because the cause that makes the selected routine operation unexecutable has been overcome is also assumed. In a case where a negative result is obtained in Step 22, the service management module 102 displays an operation screen prepared for the selected routine operation (job) (Step 23).

Display Example of Operation Screen

A display example of an operation screen using the service management function is described. First, a case (a case of a comparative example) where the function according to the present exemplary embodiment is not used is described, and next, a case where the function according to the present exemplary embodiment is used is described.

Comparative Example

FIGS. 7A through 7C are views for explaining a display example according to the comparative example. FIG. 7A illustrates a display example of a home menu, FIG. 7B illustrates an example of an authentication screen, and FIG. 7C illustrates a case where authentication has succeeded. The home menu is an example of an operation screen displayed on the display 31. In FIGS. 7A through 7C, it is assumed that an anonymous user (an unauthenticated user) is operating the operation screen. Three operation buttons 201, 202, and 203 are disposed on the home menu illustrated in FIG. 7A. In the operation button 201, a process (Scan TO PC) for supplying data of a scanned image to a computer is registered. In the present exemplary embodiment, no setting concerning a condition of execution or an executable or inexecutable state is not present in this process, and therefore no symbol is displayed on the operation button 201.

In the operation button 202 that is being operated by the user with a finger 200, a process (e-mail transmission to a person A) for transmitting an e-mail to the person A is registered. A symbol 204 indicating that authentication (need for authentication) is necessary as a condition of execution is displayed for this process. Although a setting indicating that instant execution is possible is present in this process, a symbol 205 indicative of an instant execution type is not displayed or is hidden behind the symbol 204 because of the display restriction. In the operation button 203, a process for transmitting a facsimile to a person B is registered, and a symbol 205 indicative of an instant execution type is displayed.

When the user operates the operation button 202 on the home menu, an authentication screen is displayed. On the authentication screen, an entry column 211 for user ID, an entry column 212 for password, a button 213 for an instruction to execute authentication, and a button 214 for an instruction to cancel authentication are provided. As described above, the setting of need for authentication and the setting of an instant execution type are present in the process registered in the operation button 202. Therefore, in the comparative example, transmission of an e-mail to the person A is executed without displaying a confirmation screen or an entry screen when authentication succeeds.

However, the user just recognizes that the operation button 202 requires authentication but cannot recognize that the process is an instant execution type on the home menu displayed on the display 31. Therefore, there is a possibility that the user expects that an opportunity to change contents of the e-mail transmitted to the person A is given after success of authentication. Specifically, there is a possibility that the user expects that a screen for confirmation of the e-mail to be transmitted or a screen for adding a text is displayed. That is, in the comparative example, the process progresses in a way that is not expected by the user when the user operates the operation button 202 without any opportunity for confirmation. Influence of such an unexpected progress is remarkable in a case of a pay service or a case involving transmission to an outside.

Display Example 1

FIGS. 8A through 8D are views for explaining a display example 1 using the service management function according to the first exemplary embodiment. FIG. 8A illustrates a display example of a home menu, FIG. 8B illustrates an example of an authentication screen, FIG. 8C illustrates an example of a notification screen after success of authentication, and FIG. 8D illustrates an executed operation. In FIGS. 8A through 8D, parts that correspond to those in FIGS. 7A through 7C are given corresponding reference signs. An operation unique to FIGS. 8A through 8D is an operation after success of authentication. In FIGS. 8A through 8D, when authentication succeeds, execution of e-mail transmission is suspended, and a home menu including an explanatory text 220 indicating that a routine operation selected by a user is an instant execution type is displayed. The explanatory text 220 is displayed as a pop-up window so as to draw user's attention (in a noticeable manner). Although the layout of the home menu is changed in the example illustrated in FIGS. 8A through 8D, the layout of the home menu may be maintained. In either case, a screen for notification of information that cannot be confirmed by the user at a timing of user's operation is displayed in a manner distinguishable from other displayed items.

In FIG. 8C, a symbol displayed on the operation button 202 changes to a symbol 205. Since the explanatory text 220 is displayed, the symbol 204 indicative of need for authentication may be maintained on the operation button 202. The display example 1 corresponds to an operation in which a negative result is obtained in Step 12 of the processing operation illustrated in FIG. 6, Step 18 is performed in which a positive result is obtained, Step 20 is performed, a positive result is obtained in Steps 21 and 22, and Step 17 is performed. In this example, transmission of an e-mail to the person A is executed after five seconds from a timing of pop-up display of the explanatory text 220.

A difference from the comparative example is that progress of the process registered in the operation button 202 is suspended after success of authentication, and a reason for the suspension (the explanatory text 220) is displayed as a pop-up window on the display 31. In the display example 1, the user can be notified about execution of e-mail transmission without additional confirmation or entry before e-mail transmission through notification of the presence of a setting (an instant execution type) that cannot be confirmed on the home menu. Because of this notification, the user can know at least the progress of the process beforehand. In the display example 1, suspension is cancelled and e-mail transmission is executed after five seconds from the timing of pop-up display of the explanatory text 220. This makes it unnecessary to request the user to perform an additional operation for progressing e-mail transmission. This processing operation is preferable for a user who feels that an additional operation is troublesome. Although five seconds are illustrated as an example of a period to cancelling of suspension in the example illustrated in FIGS. 8A through 8D, the period of suspension is not limited to five seconds. The period of suspension is preferably designated by the user.

Alternatively, the state of suspension may be continued until a predetermined operation is detected. Examples of the predetermined operation may include an operation of touching the explanatory text 220. Furthermore, execution of the process itself may be cancelled upon detection of another predetermined operation. Examples of the other predetermined operation may include an operation of touching the explanatory text 220 two times successively. In a case where the process can be cancelled during suspension, it is possible to stop progress of a process that is not desired by the user in a case where user's feeling changes (e.g., a case where the user notices erroneous operation) after user's operation. For example, in a case where authentication is done by selecting a user name on the screen (e.g., simple authentication), there is a possibility that authentication succeeds and a process proceeds even in a case where the user presses a wrong user name. In a case where execution of the process can be cancelled during suspension, it is possible to make occurrence of erroneous transmission less likely.

Display Example 2

Figure 9A:
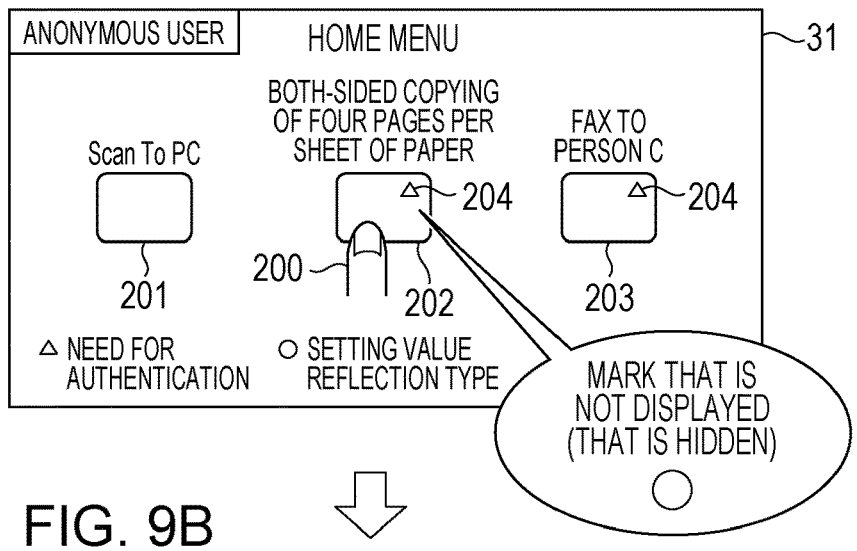
Figure 9B:
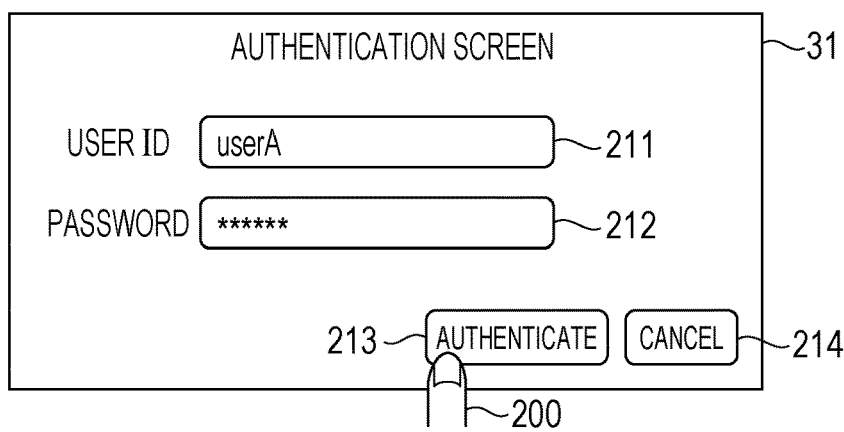
Figure 9C:
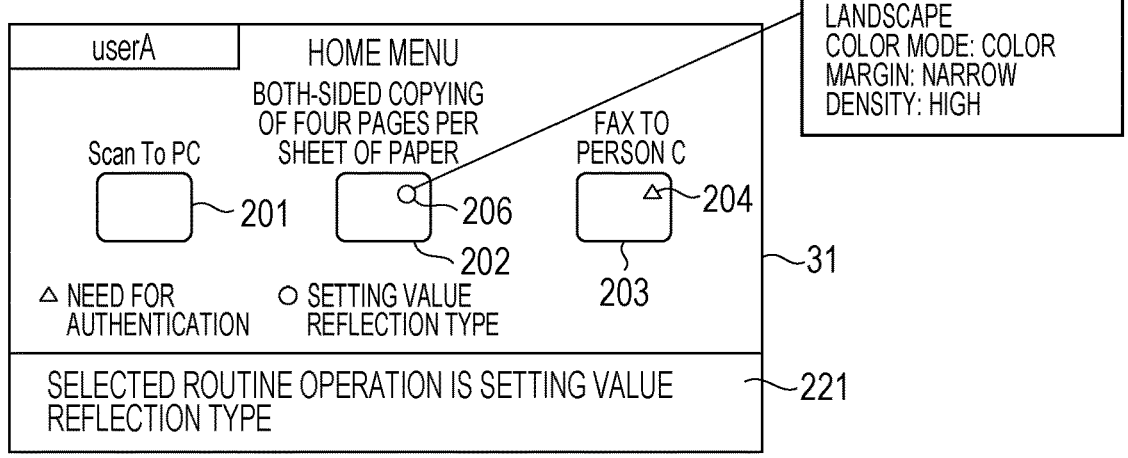

FIGS. 9A through 9D are views for explaining a display example 2 using the service management function according to the first exemplary embodiment. FIG. 9A illustrates a display example of a home menu, FIG. 9B illustrates an example of an authentication screen, FIG. 9C illustrates an example of a notification screen after success of authentication, and FIG. 9D illustrates an executed operation. In FIGS. 9A through 9D, parts that correspond to those in FIGS. 8A through 8D are given corresponding reference signs. FIGS. 9A through 9D are different from FIGS. 8A through 8D in term of contents of processes registered in the operation button 202 and the operation button 203. A process for double-sided copying of four pages per sheet of paper is registered in the operation button 202. For this process, the symbol 204 indicating that authentication is necessary as a condition of execution (need for authentication) is displayed. Although execution of printing reflecting a setting value registered in advance is set in this process, a symbol 206 indicative of a setting value reflection type is not displayed or is hidden behind the symbol 204 due to the display restriction. In the operation button 203, a process for transmitting a facsimile to a person C is registered, and the symbol 204 indicative of need for authentication is displayed.

In FIGS. 9A through 9D, when a user operates the operation button 202, a screen for authentication is displayed, and a process necessary for authentication is executed. When authentication succeeds, execution of copying reflecting the setting value is suspended, and a home menu including an explanatory text 221 indicating that a routine operation selected by the user is a setting value reflection type is displayed. The explanatory text 221 is displayed as a pop-up window so as to draw user's attention (in a noticeable manner). In FIG. 9C, a symbol displayed on the operation button 202 changes to the symbol 206 indicative of a setting value reflection type. Since the explanatory text 221 is displayed, the symbol 204 indicative of need for authentication may be maintained on the operation button 202.

In FIGS. 9A through 9D, use of a sheet of paper of an A4 size, landscape orientation, a color mode, a narrow margin, a high density, and the like are set as settings of both-sided copying of four pages per sheet of paper, but use of the setting values registered in advance cannot be confirmed on the home menu at a time of user's operation (at a timing of FIG. 9A). Therefore, there is a possibility that the user expects that an opportunity to enter or select a setting value used for copying is given after authentication. In the display example 2, however, the presence of the explanatory text 221 allows the user to understand that copying reflecting the setting values registered in advance is executed before start of copying although the user cannot know contents of the setting values.

This display example 2 can be realized by executing processing in which a negative result is obtained in Step 12 of the processing operation illustrated in FIG. 6, Step 18 is performed in which a positive result is obtained, Step 20 is performed, a positive result is obtained in Step 21, Step 22 is performed in which a negative result is obtained, a process for determining whether or not a selected routine operation is a setting value reflection type is provided, and in a case where a positive result is obtained in this process, execution of the process is suspended and the user is notified that the selected routine operation is a setting value reflection type. In a case where a negative result is obtained in the process for determine whether or not the selected routine operation is a setting value reflection type, it is only necessary to proceed to Step 23 (see FIG. 6). In this display example 2, both-sided copying of four pages per sheet of paper is started on the basis of the setting values registered in advance after five seconds from a timing of pop-up display of the explanatory text 221.

Display Example 3

FIGS. 10A through 10E are views for explaining a display example 3 using the service management function according to the first exemplary embodiment. FIG. 10A illustrates a display example of a home menu, FIG. 10B illustrates an example of an authentication screen, FIG. 10C illustrates a change of management data that occurs after user's operation, FIG. 10D illustrates an example of a notification screen after success of authentication, and FIG. 10E illustrates an executed operation. In FIGS. 10A through 10E, parts that correspond to those in FIGS. 8A through 8D are given corresponding reference signs. One difference of FIGS. 10A through 10E from FIGS. 8A through 8D is that a setting of an instant execution type is not present in a process (e-mail transmission to the person A) registered in the operation button 202 at a timing of user's operation (at a timing of FIG. 10A). That is, in the case of FIGS. 10A through 10E, the setting displayed on the home menu is not different from an actual setting.

Another difference of FIGS. 10A through 10E from FIGS. 8A through 8D is that setting management data changes after authentication. Such an event occurs in a case where a setting of instant execution that has been made inactive due to the presence of a setting of need for authentication that hinders instant execution becomes active because of authentication. That is, the display example 3 represents a case where a difference occurs between a displayed setting and a managed setting afterward. The service management function according to the present exemplary embodiment can also cope with such a case where a difference occurs between a displayed setting and a managed setting afterward. That is, even in a case where inconsistency occurs afterwards, the service management function according to the present exemplary embodiment makes it possible to suspend progress of a process so that the process (e-mail transmission to the person A) unexpected by a user is not executed and to present a reason for suspension to the user.

Display Example 4

FIGS. 11A through 11E are views for explaining a display example 4 using the service management function according to the first exemplary embodiment. FIG. 11A illustrates a display example of a home menu, FIG. 11B illustrates a change of management data that occurs after user's operation, FIG. 11C illustrates an example of an authentication screen, FIG. 11D illustrates an example of a notification screen after success of authentication, and FIG. 11E illustrates an executed operation. In FIGS. 11A through 11E, parts that correspond to those in FIGS. 8A through 8D are given corresponding reference signs. FIGS. 11A through 11E are different from FIGS. 8A through 8D in that the routine operation list module 101 (see FIG. 4) does not recognize the presence of a setting of an instant execution type in the operation button 202 at a timing of user's operation (at a timing of FIG. 11A).

That is, at the timing of user's operation (at the timing of FIG. 11A), two settings, i.e., need for authentication and an instant execution type are set in the process (e-mail transmission to the person A) registered in the operation button 202 in the routine operation holding database 45A (see FIG. 4), but contents of the settings are not reflected in the setting displayed by the routine operation list module 101. In this case, from the perspective of the routine operation list module 101, information on the settings of the operation button 202 is displayed without deficiency and excess. In FIGS. 11A through 11E, the setting displayed by the routine operation list module 101 is updated after user's operation. This update may be executed upon user's operation of the operation button 202 or may be executed irrespective of the user's operation. In either case, information on a setting that can be confirmed on the home menu and information on a managed setting are not consistent.

The service management function according to the present exemplary embodiment can also cope with such a case where a difference occurs between a displayed setting and a managed setting afterwards. That is, even in a case where inconsistency occurs afterwards, the service management function according to the present exemplary embodiment makes it possible to suspend progress of a process so that the process (e-mail transmission to the person A) unexpected by a user is not executed and to present a reason for suspension to the user.

Display Example 5

FIGS. 12A through 12E are views for explaining a display example 5 using the service management function according to the first exemplary embodiment. FIG. 12A illustrates a display example of a home menu, FIG. 12B illustrates a setting screen, FIG. 12C illustrates update of management data caused by a change of a setting, FIG. 12D illustrates an example of a notification screen after the update, and FIG. 12E illustrates an executed operation. In FIGS. 12A through 12E, parts that correspond to those in FIGS. 10A through 10E are given corresponding reference signs. In the display example 5, a process (e-mail transmission to the person A) allocated to the operation button 202 is set unexecutable. Accordingly, a symbol 207 indicative of an unexecutable state is displayed in the operation button 202.

A user who has confirmed the symbol 207 operates the operation button 202 while understanding that cancelling of the setting of an unexecutable state is needed to transmit an e-mail to the person A. On the setting screen illustrated in FIG. 12B, a screen 215 that indicates that the process is currently set unexecutable and inquires the user as to whether to desire cancelling of the setting, a button 216 for cancelling the setting, and a button 217 for maintaining the setting are prepared. In the display example 5, the button 216 is operated, and the setting of an unexecutable state is cancelled. In this example, a setting of instant execution that has been made inactive due to the presence of the setting of an unexecutable state that hinders instant execution becomes active because of cancelling of the unexecutable state. That is, a difference occurs between a displayed setting and a managed setting afterward.

Also in this display example 5, when it is confirmed that a difference occurs between a displayed setting and a managed setting afterward, execution of the process (e-mail transmission to the person A) allocated to the operation button 202 is suspended, and the user can be notified of start of e-mail transmission to the person A without another screen operation. Use of the service management function according to the present exemplary embodiment makes it possible to give the user an opportunity to confirm whether or not the operation is an intended one before transmission of an e-mail even in a case where the function of instant execution that has been made inactive becomes active because of cancelling of the setting of an unexecutable state.

Display Example 6

FIGS. 13A through 13D are views for explaining a display example 6 using the service management function according to the first exemplary embodiment. FIG. 13A illustrates a display example of a home menu, FIG. 13B illustrates an example of an authentication screen, FIG. 13C illustrates an example of a notification screen after success of authentication, and FIG. 13D illustrates an executed operation. In FIGS. 13A through 13D, parts that correspond to those in FIGS. 10A through 10E are given corresponding reference signs. FIGS. 13A through 13D are different from FIGS. 8A through 8D in terms of a screen displayed after success of authentication. An explanatory text 222 illustrated in FIG. 13C indicates that a job is executed after five seconds and information on elapse of time (a current time to a whole suspension period) in addition to the presence of a setting of an instant execution type in the operation button 202. Furthermore, the screen for notification illustrated in FIG. 13C includes a button 223 for an instruction to execute a job and a button 224 for cancelling execution of the job.

In the case of the display example 6, a suspension period is explicitly displayed as a text, and a user can confirm a remaining period to cancelling of suspension, unlike the display examples 1 to 5 described above. Therefore, use of the display example 6 allows even a user who is unfamiliar with this kind of display to select whether to permit progress of a process or stop progress of the process by cancelling user's operation while knowing a period to cancelling of suspension. When the button 223 is operated, execution of the process (e-mail transmission to the person A) registered in the button 202 is started even before elapse of five seconds that are the suspension period. Even in a case where the button 223 or 224 is not operated, suspension is cancelled after five seconds, and execution of the process starts.

Display Example 7

FIGS. 14A through 14C are views for explaining a display example 7 using the service management function according to the first exemplary embodiment. FIG. 14A illustrates a display example of a home menu, FIG. 14B illustrates an example of a notification screen after user's operation, and FIG. 14C illustrates an executed operation. In FIGS. 14A through 14C, parts that correspond to those in FIGS. 11A through 11E are given corresponding reference signs. The display example 7 represents a state where an authentication omission type is set in a process (e-mail transmission to the person A) registered in the operation button 202 in the routine operation holding database 45A (see FIG. 4), but a setting of need for authentication remains in the routine operation list module 101. This occurs in a case where update of a setting by the routine operation list module 101 and update of a setting by the routine operation holding database 45A are independently executed.

The authentication omission type is a setting that does not need an authentication process. In a case where an authentication omission type is set, a screen for authentication is not displayed after user's operation. However, a screen other than a screen for authentication such as a screen for entry or a screen for confirmation may be displayed. In the present exemplary embodiment, in a case where a setting of an authentication omission type is present, a process is executed without display of an additional screen. Note, however, that the process may be executed on the condition of elapse of a predetermined period. Whether to set need for authentication or authentication omission can be selected by the user beforehand.

In the present exemplary embodiment, when the operation button 202 is operated, e-mail transmission to the person A starts contrary to expectation of a user who believed display on the home menu. Accordingly, in the case of the display example 7, an explanatory text 225 indicating that a routine operation registered in the operation button 202 is an authentication omission type is displayed after operation of the operation button 202. The explanatory text 225 also indicates that a job is executed after five seconds and indicates information on elapse of time (a current time to a whole suspension period). Furthermore, the screen for notification illustrated in FIG. 14B includes a button 223 for an instruction to execute a job and a button 224 for cancelling of execution of the job.

This display example 7 can be realized by executing processing in which a positive result is obtained in Step 12 of the processing operation illustrated in FIG. 6, Step 13 is performed in which a negative result is obtained, a process for determining whether or not a displayed process is an authentication omission type is provided, and in a case where a positive result is obtained in this process, execution of the process is suspended, and information indicating that the selected routine operation is an authentication omission type is presented to the user. In a case where a negative result is obtained in the process for determining whether or not the displayed process is an authentication omission type, it is only necessary to proceed to Step 14.

Also in the case of the display example 7, a suspension period is explicitly displayed as a text, and a remaining period to cancelling of suspension is also presented so that the user can confirm the remaining period, unlike the display examples 1 through 5 described above. Accordingly, use of the display example 7 allows even a user who is unfamiliar with this kind of display to be given an opportunity to select whether to permit progress of a process or stop progress of the process by cancelling user's operation while knowing a period to cancelling of suspension. When the button 223 is operated, execution of the process (e-mail transmission to the person A) registered in the button 202 is started even before elapse of five seconds that are the suspension period. Even in a case where the button 223 or 224 is not operated, suspension is cancelled and execution of the process starts after five seconds.

Display Example 8

FIGS. 15A through 15D are views for explaining a display example 8 using the service management function according to the first exemplary embodiment. FIG. 15A illustrates a display example of a home menu, FIG. 15B illustrates an example of an authentication screen, FIG. 15C illustrates an example of a notification screen after success of authentication, and FIG. 15D illustrates an executed operation. In FIGS. 15A through 15D, parts that correspond to those in FIGS. 8A through 8D are given corresponding reference signs. The display example 8 is a modification of the display example 1 illustrated in FIGS. 8A through 8D. The display example 8 is different from the display example 1 in that an explanatory text 222 including information indicative of a suspension period is displayed as in the display example 6. Use of this display example 8 allows even a user who is unfamiliar with this kind of display to select whether to permit progress of a process or stop progress of the process by cancelling user's operation while knowing a period to cancelling of suspension.

Display Example 9

FIGS. 16A through 16F are views for explaining a display example 9 using the service management function according to the first exemplary embodiment. FIG. 16A illustrates a display example of a home menu, FIG. 16B illustrates an operation screen for an administrator, FIG. 16C illustrates a display example of a home menu after operation of an administrating user, FIG. 16D illustrates execution of an authentication process, FIG. 16E illustrates an example of a notification screen after operation of an anonymous user, and FIG. 16F illustrates an executed operation. In FIGS. 16A through 16F, parts that correspond to those in FIGS. 8A through 8D are given corresponding reference signs. The display example 9 is an example of a case where a setting for an operation button is changed irrespective of operation of a user (an anonymous user in this example) who operates the image forming apparatus 1 (see FIG. 1). Specifically, an administrator changes a setting.

Accordingly, both of a managed setting and a displayed setting for the operation button 202 before user's operation (at a timing of FIG. 16A) are need for authentication. In the display example 9, a setting is changed by administrator's operation before user's operation. On an operation screen 310 illustrated in FIG. 16B, a column 311 in which the image forming apparatus 1 to be operated is displayed and a column 312 for selection of a service for which execution by an anonymous user is permitted without authentication are prepared. Two services, i.e., a process (Scan TO PC) for supplying data of a scanned image to a computer and e-mail transmission to the person A are illustrated in the selection column 312, and both of the service are given a check mark. A service given a check mark is a service that does not require authentication of an anonymous user, and a service without a check mark is a service that requires authentication of an anonymous user. Furthermore, a button 313 for an instruction to determine a setting and a button 314 for cancelling a setting are prepared on the operation screen 310.

In the display example 9 illustrated in FIGS. 16A through 16F, there is a difference between a managed setting and a displayed setting at a timing of user's operation of the operation button 202, as illustrated in FIG. 16C. A user who operates the operation button 202 on the home menu cannot know from the displayed symbol 204 that the operation button 202 is an instant execution type. A subsequent display flow is similar to that in FIGS. 8A through 8D. Specifically, a screen for notifying the user that the operation button 202 is an instant execution type after authentication using an authentication screen is displayed (not illustrated), and an e-mail is transmitted to the person A after five seconds from a timing of display of the screen. This display example 9 is an example in which an external factor changes a setting for specific operation allocated to the operation button 202 and a difference occurs between a setting that can be confirmed on the screen and a managed setting. Also in this case, use of the service management function according to the present exemplary embodiment makes it possible to suspend progress of a process so that the process (e-mail transmission to the person A) unexpected by a user is not executed and to present a reason for suspension to the user.

Display Example 10

FIGS. 17A through 17D are views for explaining a display example 10 using the service management function according to the first exemplary embodiment. FIG. 17A illustrates a display example of a home menu, FIG. 17B illustrates an example of an authentication screen, FIG. 17C illustrates an example of a notification screen after success of authentication, and FIG. 17D illustrates an executed operation. In FIGS. 17A through 17D, parts that correspond to those in FIGS. 9A through 9D are given corresponding reference signs. The display example 10 shows a case where a setting of a setting value reflection type is not reflected in display of the home menu as in the display example 2. In addition, in the display example 10, it is assumed that an amount of money charged as a result of execution of a process differs.

Specifically, a message 209 indicating that monochrome printing that costs 10 yen per copy is executed is displayed at a timing of user's operation of the operation button 202 (at a timing of FIG. 17A). A user believed this message 209 expects that monochromatic both-sided copying of four pages per sheet of paper is executed after authentication. However, a managed setting is a setting value reflection type, and full-color printing is set, as illustrated in the balloon.

Therefore, in the display example 10, after success of authentication, an explanatory text 226 indicating that a setting of a setting value reflection type is present in a routine operation allocated to the operation button 202 and a message 210 indicating that full-color printing that costs 30 yen per copy is executed are displayed. The explanatory text 226 shows a reason for suspension of execution of the process, unlike the other display examples. In a case where an amount of charged money differs or in a case involving communication with an outside as in the display example 10, it is possible to avoid a process that is not desired by a user by suspending execution of the process without executing the process in accordance with a managed setting and by giving an opportunity for user's confirmation. The explanatory text 226 may include information indicating that full-color printing that costs 30 yen per copy is executed.

Second Exemplary Embodiment

Figure 18:
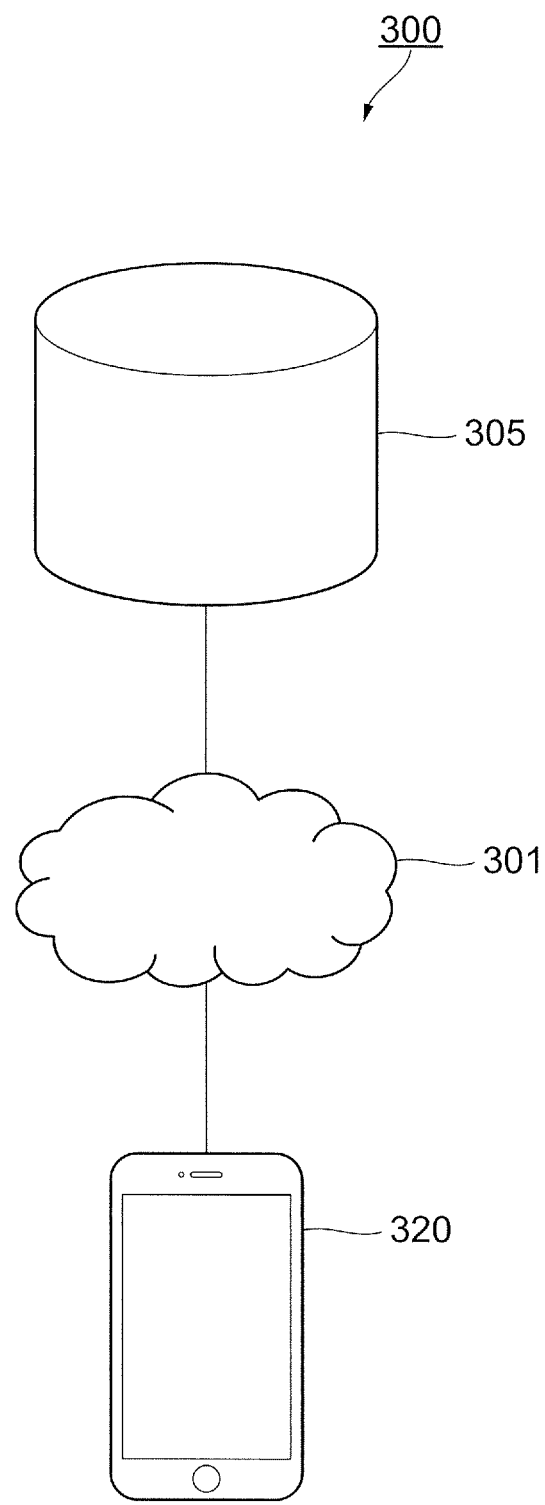
FIG. 18 illustrates an example of an information processing system according to a second exemplary embodiment.

In the present exemplary embodiment, an information terminal connected to a cloud-type network is described. FIG. 18 illustrates an example of an information processing system 300 according to the second exemplary embodiment. The information processing system 300 is constituted by a cloud network 301, a cloud server 305 that offers a cloud service, and an information terminal 320 that uses the cloud service. The information terminal 320 is an example of an information processing apparatus. The information terminal 320 is, for example, a smartphone or a tablet terminal.

Figure 19:
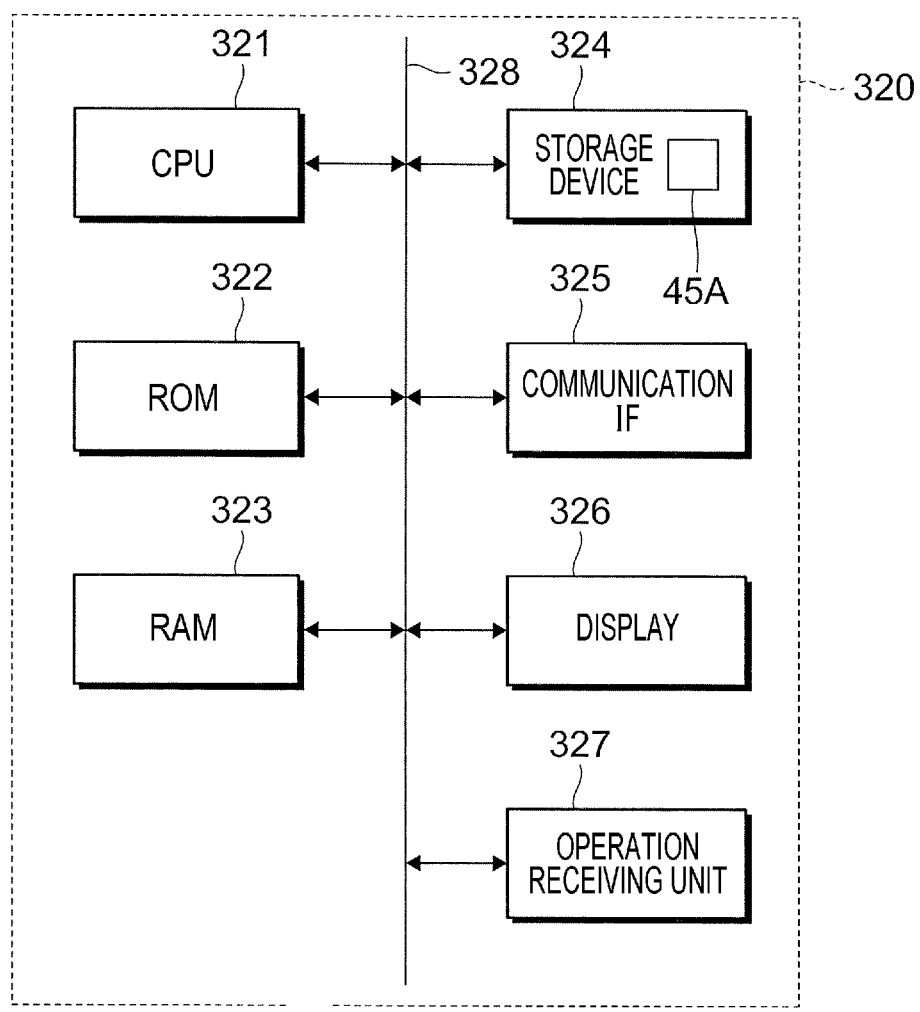
FIG. 19 illustrates an example of a hardware configuration of an information terminal.

FIG. 19 illustrates an example of a hardware configuration of the information terminal 320. The information terminal 320 is basically configured as a computer and has a function of communication with an outside. The information terminal 320 according to the present exemplary embodiment includes a CPU 321, a ROM 322 in which firmware, BIOS, and the like are stored, a RAM 323 used as a work area of the CPU 321, a storage device 324 in which data and a program are stored, a communication interface (communication IF) 325 used for communication with an outside, a display 326 that presents information to a user, and an operation receiving unit 327 that receives an instruction from the user. In the present exemplary embodiment, a routine operation holding database 45A is stored in the storage device 324. The display 326 displays a screen for operation, a software key, and the like. The operation receiving unit 327 detects, for example, operation on a hardware key or a software key. The CPU 321 and each unit are connected through a bus 328.

A processing function of the information terminal 320 is realized through execution of a program. The processing function executed by the information terminal 320 is identical to that of the image forming apparatus 1 (see FIG. 1), and therefore description thereof is omitted. That is, the information terminal 320 executes the processing operations illustrated in FIGS. 5 and 6 through the service management function illustrated in FIG. 4. The following describes a display example in the information terminal 320.

FIGS. 20A through 20E are views for explaining a display example using the service management function according to the second exemplary embodiment. FIG. 20A illustrates a display example of an operation screen, FIG. 20B illustrates an example of an authentication screen, FIG. 20C illustrates an example of a notification screen after success of authentication, FIG. 20D illustrates an operation performed in a case where a button for execution is operated, and FIG. 20E illustrates an operation performed in a case where a button for cancelling is operated. In FIGS. 20A through 20E, parts that correspond to those in FIGS. 13A through 13D are given corresponding reference signs. Two operation buttons 231 and 232 are displayed on an operation screen displayed on the display 326 illustrated in FIG. 20A. In the operation button 232, connection to the cloud service A is registered as a routine operation.

In FIGS. 20A through 20E, a setting of need for authentication and a setting of thumbnail creation and display are provided in the routine operation registered in the operation button 232. However, only a symbol 204 indicative of need for authentication is displayed on the operation screen due to display restriction. In this case, a user can predict that authentication is needed after operation of the operation button 232 but cannot know that creation of thumbnails of all images in a connection destination starts after the end of authentication. It takes a longer period to create the thumbnails as the number of images handled in the cloud service A becomes larger. Furthermore, the user need to wait until creation of the thumbnails is finished.

In view of this, in the present exemplary embodiment, an explanatory text 331 for notifying the user that there is a setting that has a risk of making the user wait for a long period is displayed. The explanatory text 331 in FIG. 20C indicates that movement to the cloud service A is executed five seconds later and information on elapse of time (a current time to a whole suspension period) in addition to the presence of a setting of thumbnail creation and display in the operation button 202. Furthermore, the screen for notification illustrated in FIG. 20C includes a button 332 for an instruction to execute a job and a button 333 for cancelling execution of the job.

In this display example, a suspension period is explicitly displayed as a text, and a remaining period to cancelling of suspension can also be confirmed, as in the case of FIGS. 13A through 13D. Accordingly, use of this display example allows even a user who is unfamiliar with this kind of display to be given an opportunity to select whether to permit progress of a process or stop progress of the process by cancelling user's operation while knowing a period to cancelling of suspension. When the button 332 is operated, execution of the process (movement to the cloud service A) allocated to the button 232 is started even before elapse of five seconds that are the suspension period. Meanwhile, in a case where the button 333 is operated, a home image is displayed on the display 326 so that other operation can be received. Even in a case where the button 332 or 333 is not operated, suspension is cancelled and execution of the process starts after five seconds.

Other Exemplary Embodiments

Exemplary embodiments of the present invention have been described above, but the technical range of the present invention is not limited to the range described in the exemplary embodiments. For example, it is apparent from the recitations of the claims that various changes or modifications to the above exemplary embodiments are also encompassed within the technical range of the present invention.

For example, in the above exemplary embodiments, contents of a setting concerning routine operation allocated to an operation button are represented by a symbol (a badge-shaped small mark) but may be represented by a different display form. For example, contents of a setting concerning routine operation may be displayed as a text (dialogue) or may be displayed in a banner form in an upper portion of a screen. In the above exemplary embodiments, an operation button is used, but an icon may be used. In the second exemplary embodiment, creation of thumbnails is illustrated as an example of a process that takes a long processing period. However, it is also possible to employ a mechanism of suspending a process in a case where a volume of data acquired before start of download is large and set communication means is a pay-as-you-go line (e.g., a 4G line). This example is an example in which an amount of charged money differs. Furthermore, this example is an example in which communication with an outside occurs. The communication with an outside may be upload.

Although a case where there is a setting that involves creation of thumbnails is illustrated in the second exemplary embodiment, it is also desirable that a process can be suspended before execution of the process in a case where activation of a browser that takes a long period to start up is set. Suspension makes it possible to omit the trouble of stopping an operation during activation of the browser that takes a long period to start up and the trouble of returning to a home screen.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an input device that receives an operation on an operator displayed on a screen for operation; and
a processor programmed to, in a case where there is a difference between information on a managed setting concerning a process registered in the operator and information for notification of the setting displayed in association with the operator, suspends execution of the process and presents information indicative of the difference, wherein
the difference occurs in a case where part of the information for notification of the setting is hidden by another part of the information for notification of the setting.

2. The information processing apparatus according to claim 1, wherein
the hidden part of the information is information indicating that execution of the process is permitted without displaying a screen for entry or confirmation after the operation on the operator.

3. The information processing apparatus according to claim 1, wherein
the other part of the information is information indicative of need to display a screen for entry or confirmation before execution of the process.

4. The information processing apparatus according to claim 1, wherein
the information on the managed setting is acquired when the operator is operated.

5. The information processing apparatus according to claim 1, wherein
the information on the managed setting is acquired when a screen for entry or confirmation displayed after the operation on the operator is operated.

6. The information processing apparatus according to claim 1, wherein the setting has a plurality of modes that progress in different ways and are selectable by a user, and the difference is a difference in mode.

7. The information processing apparatus according to claim 6, wherein
one of the plurality of modes requires an additional operation of the user for execution of the process, and another one of the plurality of modes does not require an additional operation of the user for execution of the process.

8. The information processing apparatus according to claim 7, wherein
in the other one of the plurality of modes, the process is executed after elapse of a predetermined period from a timing of display of a screen for confirmation.

9. The information processing apparatus according to claim 1, wherein
an additional operation of a user is received during suspension of execution of the process that is suspended for notification of the information indicative of the difference.

10. The information processing apparatus according to claim 1, wherein
a plurality of modes selectable by a user are present as a method of notification of the information indicative of the difference; and
one of the plurality of modes requires an additional operation of a user for execution of the process, and another one of the plurality of modes does not require user's additional operation for execution of the process.

11. The information processing apparatus according to claim 1, wherein
additional information different from the information indicative of the difference is presented during suspension of execution of the process.

12. The information processing apparatus according to claim 1, wherein
suspension of execution of the process is executed in a case where execution of the process costs money.

13. The information processing apparatus according to claim 1, wherein
suspension of execution of the process is executed in a case where an amount of charged money differs due to the difference between the information.

14. The information processing apparatus according to claim 1, wherein
suspension of execution of the process is executed in a case where communication with an outside occurs as a result of execution of the process.

15. The information processing apparatus according to claim 1, wherein
the information indicative of the difference is presented in a more noticeable manner than the information for notification of the setting of the process displayed in association with the operator.

16. The information processing apparatus according to claim 15, wherein
the information indicative of the difference is presented on a nearer side than the operator by using a screen different from the operator.

17. The information processing apparatus according to claim 1, wherein
the process is executable even in a case where at least part of the information for notification of the setting of the process is not displayed in association with the operator.

18. A non-transitory computer readable medium storing a program causing a computer to execute a process comprising:
receiving an operation that is input on an operator displayed on a screen for operation; and
in a case where there is a difference between information on a managed setting concerning a process registered in the operator and information for notification of the setting displayed in association with the operator, suspending execution of the process and presenting information indicative of the difference, wherein
the difference occurs in a case where part of the information for notification of the setting is hidden by another part of the information for notification of the setting.

19. An information processing apparatus comprising:
means for receiving an operation on an operator displayed on a screen for operation; and
means for, in a case where there is a difference between information on a managed setting concerning a process registered in the operator and information for notification of the setting displayed in association with the operator, suspending execution of the process and presenting information indicative of the difference, wherein
the difference occurs in a case where part of the information for notification of the setting is hidden by another part of the information for notification of the setting.

* * * * *